United States Patent
Kulik et al.

(10) Patent No.: US 9,785,254 B2
(45) Date of Patent: Oct. 10, 2017

(54) SYSTEM AND METHOD FOR IMPROVING ORIENTATION DATA

(71) Applicant: QUALCOM Incorporated, San Diego, CA (US)

(72) Inventors: Victor Kulik, San Jose, CA (US); Disha Ahuja, Campbell, CA (US); Carlos M. Puig, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 838 days.

(21) Appl. No.: 13/651,343

(22) Filed: Oct. 12, 2012

(65) Prior Publication Data
US 2013/0110439 A1    May 2, 2013

Related U.S. Application Data

(60) Provisional application No. 61/554,423, filed on Nov. 1, 2011, provisional application No. 61/558,994, filed
(Continued)

(51) Int. Cl.
*G06F 19/00* (2011.01)
*G01P 15/00* (2006.01)
(Continued)

(52) U.S. Cl.
CPC .......... *G06F 3/0346* (2013.01); *G01C 17/38* (2013.01); *G01C 21/165* (2013.01);
(Continued)

(58) Field of Classification Search
CPC .......... G06F 19/00; G06F 15/00; G06F 17/00; G06F 3/0346
See application file for complete search history.

(56) References Cited

U.S. PATENT DOCUMENTS

| | | | |
|---|---|---|---|
| 4,675,820 A | 6/1987 | Smith et al. | |
| 4,734,863 A | 3/1988 | Honey et al. | |

(Continued)

FOREIGN PATENT DOCUMENTS

| | | | |
|---|---|---|---|
| JP | S6172618 U | 5/1986 | |
| JP | S61258112 A | 11/1986 | |

(Continued)

OTHER PUBLICATIONS

Sun et al., Adaptive Sensor Data Fusion in Motion Capture,Jul. 2010, IEEE, pp. 1-8.*

(Continued)

*Primary Examiner* — John Breene
*Assistant Examiner* — Mohammad Islam
(74) *Attorney, Agent, or Firm* — Kilpatrick Townsend & Stockton/Qualcomm

(57) ABSTRACT

Aspects of the disclosure relate to computing technologies. In particular, aspects of the disclosure relate to mobile computing device technologies, such as systems, methods, apparatuses, and computer-readable media for improving orientation data. In some embodiments, a magnetic vector filter receives magnetometer data from a magnetometer and gyroscope data from a gyroscope and determines the magnetic vector using the magnetometer data and the gyroscope data in the magnetic vector filter. In other embodiments, a gravity vector filter receives accelerometer data and gyroscope data and determines the gravity vector using the accelerometer data and the gyroscope data in the gravity vector filter.

29 Claims, 17 Drawing Sheets

Related U.S. Application Data on Nov. 11, 2011, provisional application No. 61/558,966, filed on Nov. 11, 2011.

(51) Int. Cl.

| | | |
|---|---|---|
| *G06F 15/00* | (2006.01) | |
| *G06F 3/0346* | (2013.01) | |
| *G06F 3/038* | (2013.01) | |
| *G06F 3/03* | (2006.01) | |
| *G01C 17/38* | (2006.01) | |
| *G01C 21/16* | (2006.01) | |

(52) U.S. Cl.
CPC ............ *G06F 3/0304* (2013.01); *G06F 3/038* (2013.01); *G06F 15/00* (2013.01); *G06F 2200/1637* (2013.01)

(56) References Cited

U.S. PATENT DOCUMENTS

| | | | |
|---|---|---|---|
| 5,272,639 | A | 12/1993 | McGuffin |
| 5,970,479 | A * | 10/1999 | Shepherd ............... G06Q 40/02 705/37 |
| 6,522,265 | B1 | 2/2003 | Hillman et al. |
| 7,106,189 | B2 | 9/2006 | Burneske et al. |
| 7,451,549 | B1 * | 11/2008 | Sodhi .................... G01C 17/38 33/356 |
| 7,587,277 | B1 * | 9/2009 | Wells ........................... 701/510 |
| 7,663,502 | B2 | 2/2010 | Breed |
| 8,275,544 | B1 * | 9/2012 | Wells et al. .................. 701/501 |
| 8,626,465 | B2 * | 1/2014 | Moore .................... G01K 7/42 702/141 |
| 2002/0103610 | A1 * | 8/2002 | Bachmann ............ A61B 5/1114 702/94 |
| 2005/0125141 | A1 | 6/2005 | Bye |
| 2005/0240347 | A1 * | 10/2005 | Yang ...................... G01C 21/16 701/500 |
| 2005/0242947 | A1 | 11/2005 | Burneske et al. |
| 2005/0253806 | A1 * | 11/2005 | Liberty ................ G06F 1/3215 345/156 |
| 2006/0074558 | A1 | 4/2006 | Williamson et al. |
| 2007/0032951 | A1 * | 2/2007 | Tanenhaus et al. ........... 701/220 |
| 2007/0073482 | A1 | 3/2007 | Churchill et al. |
| 2008/0234935 | A1 * | 9/2008 | Wolf ...................... G01C 21/16 701/472 |
| 2009/0184849 | A1 | 7/2009 | Nasiri et al. |
| 2009/0248301 | A1 | 10/2009 | Judd et al. |
| 2009/0265671 | A1 | 10/2009 | Sachs et al. |
| 2009/0303204 | A1 | 12/2009 | Nasiri et al. |
| 2009/0326851 | A1 * | 12/2009 | Tanenhaus ............. G01C 21/16 702/96 |
| 2010/0145611 | A1 | 6/2010 | Tokue et al. |
| 2010/0285883 | A1 | 11/2010 | Zalewski |
| 2010/0323657 | A1 | 12/2010 | Barnard et al. |
| 2011/0066395 | A1 | 3/2011 | Judd |
| 2011/0077889 | A1 | 3/2011 | Vogt |
| 2011/0106418 | A1 | 5/2011 | Van Der Merwe |
| 2011/0125323 | A1 | 5/2011 | Gutmann et al. |
| 2011/0163955 | A1 | 7/2011 | Nasiri et al. |
| 2011/0187652 | A1 | 8/2011 | Huibers |
| 2011/0215952 | A1 | 9/2011 | Aria et al. |
| 2011/0216060 | A1 | 9/2011 | Weising et al. |
| 2011/0234825 | A1 | 9/2011 | Liu et al. |
| 2011/0239026 | A1 * | 9/2011 | Kulik .................... G01C 19/00 713/324 |
| 2011/0242342 | A1 | 10/2011 | Goma et al. |
| 2011/0246125 | A1 | 10/2011 | Shkolnikov |
| 2011/0264393 | A1 | 10/2011 | An et al. |
| 2011/0292166 | A1 * | 12/2011 | Schall .................. G06T 3/4038 348/37 |
| 2011/0307213 | A1 * | 12/2011 | Zhao ...................... G01C 17/30 702/153 |
| 2012/0070037 | A1 | 3/2012 | Polle |
| 2012/0086725 | A1 | 4/2012 | Joseph et al. |
| 2012/0158296 | A1 | 6/2012 | Waters et al. |
| 2012/0165074 | A1 | 6/2012 | Soldan et al. |
| 2012/0172763 | A1 * | 7/2012 | King et al. ..................... 600/595 |
| 2012/0191345 | A1 | 7/2012 | Roh |
| 2012/0221290 | A1 | 8/2012 | Oka et al. |
| 2012/0259578 | A1 * | 10/2012 | Bevilacqua ........... G06F 1/1694 702/141 |
| 2013/0018582 | A1 | 1/2013 | Miller et al. |
| 2013/0106697 | A1 | 5/2013 | Kulik |
| 2013/0110450 | A1 | 5/2013 | Kulik |
| 2017/0131094 | A1 | 5/2017 | Kulik |

FOREIGN PATENT DOCUMENTS

| | | |
|---|---|---|
| JP | H02205709 A | 8/1990 |
| JP | 2000013636 A | 1/2000 |
| JP | 2000283801 A | 10/2000 |
| JP | 2005114537 A | 4/2005 |
| WO | WO2012040629 A2 | 3/2012 |

OTHER PUBLICATIONS

Sabatini, Kalman-Filter-Based Orientation Determination Using Inertial/Magnetic Sensors: Observability Analysis and Performance Evaluation, 2011, pp. 1-25.*

Ang et al., Kalman Filtering for Real-Time Orientation Traking of Handheld Microsurgical Instrument, 2004, IEEE, pp. 2574-2580.*

Roetenberg, Inertial and Magnetic Sensing of Human Motion, 2006, pp. 1-23.*

International Search Report and Written Opinion—PCT/US2012/062612—ISA/EPO—Aug. 27, 2013.

Partial International Search Report—PCT/US2012/062612—ISA/EPO—Feb. 13, 2013.

Ying-Dong, Hu et al., "Combined heading technology in vehicle location and navigation systems", IEEE International Conference on Software Engineering and Service Sciences (ICSESS), Jul. 16, 2010, IEEE, Piscataway, NJ, USA, pp. 53-57, XP031735008, ISBN: 978-1-4244-6054-0.

Kourogi M., et al., "Indoor Positioning System using a Self-Contained Sensor Module for Pedestrian Navigation and its Evaluation", Symposium "Mobile 08" Proceedings, Japan, 2008, pp. 1-6.

Kourogi M., et al., "Personal Positioning based on Data Fusion of GPS and Dead-Reckoning with Human Walking Locomotion Analysis", The Article of the 19th Annual Conference of the Japanese Society for Artificial Intelligence, Japan, 2005, pp. 1-2.

Hao Z., et al., "Integrated Navigation System Based on Differential Magnetic Compass and GPS", Information Engineering and Computer Science, 2009, ICIECS 2009, International Conference on, Jan. 1, 2009 (Jan. 1, 2009), Piscataway, NJ, USA, XP055360173, pp. 1-4.

* cited by examiner

SYSTEM AND METHOD FOR IMPROVING ORIENTATION DATA

CROSS-REFERENCE TO RELATED APPLICATIONS

This patent application claims the benefit of U.S. Provisional Patent Application No. 61/554,423, filed Nov. 1, 2011, entitled "SYSTEM AND METHOD FOR DETERMINING GRAVITY, LINEAR ACCELERATION, AND ROTATION VECTOR FOR A MOBILE DEVICE," U.S. Provisional Patent Application No. 61/558,994, filed Nov. 11, 2011, entitled GYROSCOPE-AIDED MAGNETIC ANOMALY MITIGATION," and U.S. Provisional Patent Application No. 61/558,966, filed Nov. 11, 2011, entitled "GRAVITY VECTOR BY FUSING ACCELEROMETER AND GYROSCOPE USING A KALMAN FILTER" all of which is incorporated by reference herein in its entirety for all purposes.

BACKGROUND

Aspects of the disclosure relate to computing technologies. In particular, aspects of the disclosure relate to mobile computing device technologies, such as systems, methods, apparatuses, and computer-readable media for improving orientation data.

Increasingly, computing devices, such as smart phones, tablet computers, personal digital assistants (PDAs), and other devices, include touch screens, accelerometers, magnetometers, gyroscopes, cameras, proximity sensors, microphones, barometers, and/or other sensors that may allow these devices to capture motion and orientation and/or other sensed conditions as a form of user input. Application developers and users for devices are finding new and novel ways of utilizing the motion and device orientation associated with the devices. Vast array of sensors have become common on most devices.

Sensors such as accelerometers, gyroscopes, magnetometers aid in determining the motion and orientation of the device. An accelerometer measures acceleration forces including gravity. A gyroscope measures relative orientation of a device, for example based on the principles of conservation of angular momentum. A magnetometer is an instrument used for measuring the direction and strength of a magnetic field. Fusion of these sensors may allow for smooth and accurate characterization of the motion and orientation of a device.

At a device, at a hardware, firmware and software level, various sensor fusion techniques are used to improve the results from these sensors. Sensor fusion is the combining of sensory data or data derived from sensory data from disparate sources such that the resulting orientation information is in some sense more accurate, more complete, or more dependable than would be possible when these sources were used individually.

Fusing sensor inputs present a unique set of opportunities for increasing power and time efficiency of the device system without compromising accuracy for determining the motion and orientation of the device. However, fusing sensor inputs may also present a unique set of challenges for system integration and limit certain improvements. For instance, sensors may provide information in different formats than what is expected or utilized by other elements or systems. For example, some operating systems, applications, and/or other forms of hardware may utilize specific formats of measurements from the sensors as input, for example for standardization purposes. Therefore, not only is it beneficial to increase the speed and accuracy of sensor data or measurements, but it is also beneficial to generate such data or measurements in an appropriate format that is consumable by the higher layers in the device.

Furthermore, many devices such as cameras expect quick response from the sensors for enabling applications such as perspective compensation in camera images. Such applications have tight delay requirements along with high accuracy needs. Known filters used for filtering out noise may comprise static first order filters that have low performance and cannot quickly adapt to the changing noise in the operating environment of the sensors.

Aspects of the disclosure provide more convenient and effective ways of deriving orientation data.

BRIEF SUMMARY

Techniques are provided for a power efficient system for determining orientation of a device using gravity vector, magnetic vector and/or rotation vector in a device based on sensors. Sensors may include but are not limited to inertial sensors and MEMS based sensors. In some embodiments of the invention, inertial sensors such as an accelerometer, magnetometer and gyroscope are used. Furthermore, techniques are provided for speeding up the determination of the gravity vector, and magnetic vector while saving power, increasing accuracy and reformatting the output for popular operating system frameworks (such as Google Android).

Embodiments of the invention describe independent filters for accelerometer (gravity vector filter) and magnetometer (magnetic vector filter) along with the gyroscope instead of using a single filter. By separating out the input from the accelerometer and the magnetometer, the embodiments of the invention can use dynamic or adaptive filters that allow for adjustment of the time constant, gain and/or window of one or more of the filters, thereby allowing for faster and more accurate results from the inertial sensors and other types of sensors. Additionally, when the device is stationary, measurements can be captured by the sensor for vector determination and/or the gyroscope can be transitioned to a lower power state. Aspects of the invention, also discuss techniques for increasing accuracy of determining linear acceleration for a device by using a non-normalized gravity vector, providing a mechanism for the application layer to derive the fourth component of a quaternion system, and synchronizing timestamps between sensors.

An exemplary method for obtaining information for use with an orientation determination for a computing device may include receiving magnetometer data at a magnetic vector filter, wherein the magnetometer data may comprise sensor output from a magnetometer and receiving gyroscope data at the magnetic vector filter, wherein the gyroscope data may comprise sensor output from a gyroscope. Furthermore, the method may include determining a magnetic vector by using the magnetometer data and the gyroscope data in the magnetic vector filter. The magnetic vector filter may be capable of determining the magnetic vector independent of accelerometer data for use with the orientation determination.

An exemplary method for obtaining information for use with an orientation determination for a computing device may also include receiving the accelerometer data at a gravity vector filter, wherein the accelerometer data comprises sensor output from an accelerometer and receiving the gyroscope data at the gravity vector filter. Furthermore, the method may include determining a gravity vector by using the accelerometer data and the gyroscope data in the gravity vector filter, wherein the gravity vector is used for determining the orientation of the computing device.

In one embodiment, at least one of the gravity vector filter and the magnetic vector filter use an adaptive filter, and at least one filter parameter of the adaptive filter is dynamically adjustable. In one implementation, the adaptive filter may be a Kalman filter. In one aspect, the at least one filter parameter associated with a gravity vector filter may comprise one or more of a signal noise, a measurement error, a sensor calibration error or a linear acceleration. In another aspect, the at least one filter parameter associated with the magnetic vector filter may comprise one or more of sensor calibration error or a magnetic transient field. The magnetic vector filter may be separate from the gravity vector filter. In some embodiments, an expanded adaptive filter is implemented, wherein the expanded adaptive filter receives as inputs computed coordinates of the gravity vector for the computing device along with the gyroscope data and the accelerometer data.

In some embodiments, the method performed by components of the device further determines based on the magnetometer data and the gyroscope data, whether a detected change in a magnetic field in the magnetic vector filter is a magnetic anomaly. In one implementation, in response to determining that the gyroscope did not measure a change during a period of time in which the change in the magnetic field was detected, the method determines that the detected change in the magnetic field is the magnetic anomaly. The detected change in the magnetic field may be determined not to be the magnetic anomaly when the received sensor input from the gyroscope correlates to a detected change in the magnetic field, and the detected change in the magnetic field may be determined to be the magnetic anomaly when the received sensor input from the gyroscope does not correlate to the detected change in the magnetic field. In some implementations, in response to determining that the detected change in the magnetic field is the magnetic anomaly, the method disregards filter input received from the magnetometer corresponding to the detected change in the magnetic field. In other implementations, in response to determining that the detected change in the magnetic field is the magnetic anomaly, the method increases a window size associated with the magnetic vector filter. In one implementation, determining the detected change is a magnetic anomaly may comprise comparing the magnetometer data to a threshold, wherein the threshold may be based at least in part on the gyroscope data.

An exemplary computing device for determining orientation may include a receiver coupled to a magnetic vector filter and configured to receive magnetometer data at a magnetic vector filter, wherein the magnetometer data may comprise sensor output from a magnetometer and the same or different receiver configured to receive gyroscope data at the magnetic vector filter, wherein the gyroscope data may comprise sensor output from a gyroscope. Furthermore, the components of the exemplary computing device, such as the magnetic vector filter may determine a magnetic vector by using the magnetometer data and the gyroscope data in the magnetic vector filter. The magnetic vector filter may be capable of determining the magnetic vector independent of accelerometer data for use with the orientation determination.

The exemplary computing device for determining orientation may also include a receiver coupled to a gravity vector filter for receiving the accelerometer data at a gravity vector filter, wherein the accelerometer data comprises sensor output from an accelerometer and the same or different receiver for receiving the gyroscope data at the gravity vector filter. Furthermore, the components of the exemplary computing device, such as the gravity vector filter, may determine a gravity vector by using the accelerometer data and the gyroscope data in the gravity vector filter, wherein the gravity vector is used for determining the orientation of the computing device.

In one embodiment of the computing device, at least one of the gravity vector filter and the magnetic vector filter use an adaptive filter, and at least one filter parameter of the adaptive filter is dynamically adjustable. In one implementation, the adaptive filter may be a Kalman filter. In one aspect, the at least one filter parameter associated with a gravity vector filter may comprise one or more of a signal noise, a measurement error, a sensor calibration error or a linear acceleration. In another aspect, the at least one filter parameter associated with the magnetic vector filter may comprise one or more of sensor calibration error or a magnetic transient field. The magnetic vector filter may be separate from the gravity vector filter. In some embodiments, an expanded adaptive filter is implemented, wherein the expanded adaptive filter receives as inputs computed coordinates of the gravity vector for the computing device along with the gyroscope data and the accelerometer data.

In some embodiments, components of the device further determines, based on the magnetometer data and the gyroscope data, whether a detected change in a magnetic field in the magnetic vector filter is a magnetic anomaly. In one implementation, in response to determining that the gyroscope did not measure a change during a period of time in which the change in the magnetic field was detected, the computing device determines that the detected change in the magnetic field is the magnetic anomaly. The detected change in the magnetic field may be determined not to be the magnetic anomaly when the received sensor input from the gyroscope correlates to a detected change in the magnetic field, and the detected change in the magnetic field may be determined to be the magnetic anomaly when the received sensor input from the gyroscope does not correlate to the detected change in the magnetic field. In some implementations, in response to determining that the detected change in the magnetic field is the magnetic anomaly, components of the computing device disregards filter input received from the magnetometer corresponding to the detected change in the magnetic field. In other implementations, in response to determining that the detected change in the magnetic field is the magnetic anomaly, components of the computing device increases a window size associated with the magnetic vector filter. In one implementation, determining the detected change is a magnetic anomaly may comprise comparing the magnetometer data to a threshold, wherein the threshold may be based at least in part on the gyroscope data.

An exemplary non-transitory computer readable storage medium may include instructions executable by a processor, the instructions comprising instructions to receive magnetometer data at a magnetic vector filter, wherein the magnetometer data comprises sensor output from a magnetometer, to receive gyroscope data at the magnetic vector filter, wherein the gyroscope data comprises sensor output from a gyroscope, and to determine a magnetic vector by using the magnetometer data and the gyroscope data in the magnetic vector filter, the magnetic vector filter being capable of determining the magnetic vector independent of accelerometer data for use with the orientation determination.

The exemplary non-transitory computer readable storage medium may further include instructions executable by a processor, to determine based on the magnetometer data and the gyroscope data, whether a detected change in a magnetic field in the magnetic vector filter is a magnetic anomaly. In one implementation, the detected change in the magnetic field may be determined not to be the magnetic anomaly when the received sensor input from the gyroscope correlates to a detected change in the magnetic field; and the detected change in the magnetic field may be determined to be the magnetic anomaly when the received sensor input from the gyroscope does not correlate to the detected change in the magnetic field. The exemplary non-transitory computer readable storage medium may further include instructions executable by a processor to disregard filter input received from the magnetometer corresponding to the detected change in the magnetic field or/and increasing a window size associated with the magnetic vector filter, in response to determining that the detected change in the magnetic field is the magnetic anomaly.

Another or same exemplary non-transitory computer readable storage medium described above may include instructions executable by a processor, the instructions comprising instructions to receive the accelerometer data at a gravity vector filter, wherein the accelerometer data comprises sensor output from an accelerometer, to receive the gyroscope data at the gravity vector filter; and to determine a gravity vector by using the accelerometer data and the gyroscope data in the gravity vector filter, wherein the gravity vector is used for determining the orientation of the computing device.

In one implementation, the gravity vector filter and the magnetic vector filter use an adaptive filter, and at least one filter parameter of the adaptive filter is dynamically adjustable.

An exemplary apparatus may include means for receiving magnetometer data at a magnetic vector filter, wherein the magnetometer data comprises sensor output from a magnetometer, means for receiving gyroscope data at the magnetic vector filter, wherein the gyroscope data comprises sensor output from a gyroscope, and means for determining a magnetic vector by using the magnetometer data and the gyroscope data in the magnetic vector filter, the magnetic vector filter being capable of determining the magnetic vector independent of accelerometer data for use with the orientation determination.

The exemplary apparatus may further include means for determining based on the magnetometer data and the gyroscope data, whether a detected change in a magnetic field in the magnetic vector filter is a magnetic anomaly. In one implementation, the detected change in the magnetic field may be determined not to be the magnetic anomaly when the received sensor input from the gyroscope correlates to a detected change in the magnetic field; and the detected change in the magnetic field may be determined to be the magnetic anomaly when the received sensor input from the gyroscope does not correlate to the detected change in the magnetic field. The exemplary apparatus may further include means for disregarding filter input received from the magnetometer corresponding to the detected change in the magnetic field or/and a means for increasing a window size associated with the magnetic vector filter, in response to determining that the detected change in the magnetic field is the magnetic anomaly.

Another or same exemplary apparatus described above may include means for receiving the accelerometer data at a gravity vector filter, wherein the accelerometer data comprises sensor output from an accelerometer, means for receiving the gyroscope data at the gravity vector filter; and means for determining a gravity vector by using the accelerometer data and the gyroscope data in the gravity vector filter, wherein the gravity vector is used for determining the orientation of the computing device.

In one implementation, the gravity vector filter and the magnetic vector filter use an adaptive filter, and at least one filter parameter of the adaptive filter is dynamically adjustable.

An embodiment described herein includes a device. The device comprises a gravity filter configured to filter inputs from an accelerometer and a gyroscope, and a magnetic filter configured to filter inputs from a magnetometer and a gyroscope. In some embodiments, the gravity filter is separate from the magnetic filter. In some embodiments, at least one of the gravity filter and the magnetic filter use an adaptive filter, and at least one filter parameter of the adaptive filter is dynamically adjustable. In some embodiments, the gyroscope from which inputs are received by the gravity filter is the gyroscope from which inputs are received by the magnetic filter. In some of the above embodiments, the gravity filter comprises a gravity vector filter and/or the magnetic filter comprises a magnetic vector filter.

An embodiment described herein includes a method for determining a magnetic anomaly. The method comprises receiving magnetometer data at a magnetic vector filter, receiving gyroscope data at the magnetic vector filter, and determining based on the magnetometer data and the gyroscope data, whether a detected change in a magnetic field in the magnetic vector filter comprises a magnetic anomaly. In some embodiments, the magnetometer data comprises measurements or other information output from a magnetometer. In some embodiments, the gyroscope data comprises measurements or other information output from a gyroscope. In some embodiments, the method comprises determining that the detected change is a magnetic anomaly when the gyroscope did not measure a change during a period of time in which the change in the magnetic field was detected. In some embodiments, the method comprises disregarding or mitigating filter input received from the magnetometer corresponding to the detected change in the magnetic field when the detected change is determined to be a magnetic anomaly. In some embodiments, the method comprises increasing a window size associated with an input from the magnetometer when the detected change is determined to be a magnetic anomaly.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
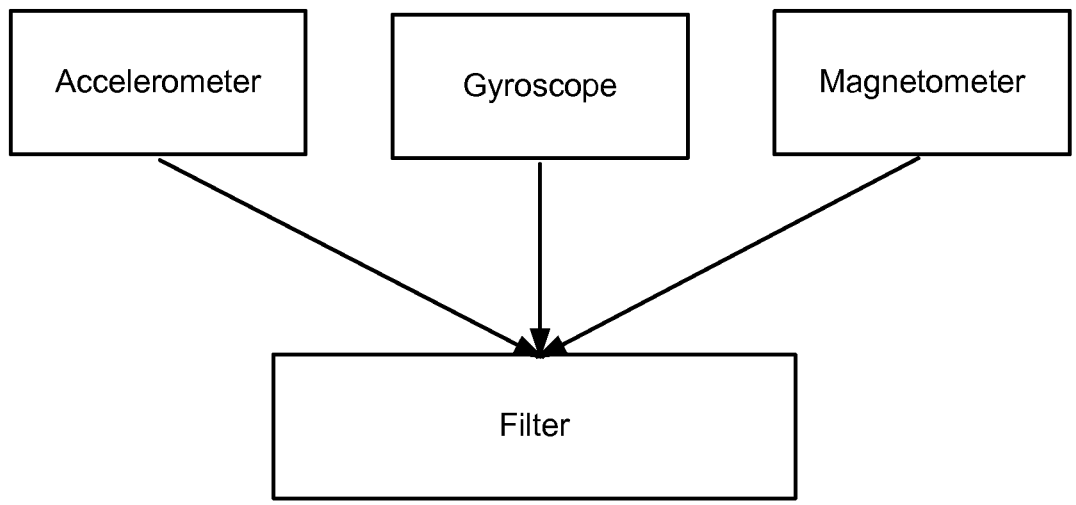
FIG. 1 is a simplified block diagram that illustrates a non-limiting exemplary system for filtering the output of an accelerometer, gyroscope and a magnetometer using a single filter.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Techniques are provided for a power efficient system for determining motion and/or orientation of a device 1600, for example by determining the gravity vector, magnetic vector, linear acceleration and/or rotation vector in the device 1600 based on sensors 1650. In some embodiments of the invention, sensors such as accelerometer 1655, magnetometer 1665 and gyroscope 1660 are used. Furthermore, techniques are provided for potentially speeding up the determination of the gravity vector, rotational vector and linear acceleration while saving power, increasing the accuracy and reformatting the output for popular operating system frameworks, such as Google Android that have specific requirements for the presentation format for the gravity vector, linear acceleration and quaternion (rotation) vector.

The determination of orientation data, such as the quaternion (rotation) vector, using gravity vector lends itself to the orientation relative to the earth. For instance, the angles calculated using the gravity vector may be used to describe the orientation relative to the earth by describing the orientation relative to the horizontal plane or the inclination to this plane. Also, the magnetic vector can be used to derive orientation data using the horizontal component of the Earth's magnetic field and the local declination.

The determination of orientation data such as the gravity vector lends itself to the orientation with respect to the horizontal plane using pitch and roll angles. The Gravity vector components can be determined from gyroscope 1660 and accelerometer 1655 measurements, for instance by gyro-aided filtering of acceleration. Earth's magnetic field measurements are also available, allowing for determination of the third Euler angle Yaw (referred to as Azimuth angle in Google® Android terminology). Alternatively to pitch, roll, and yaw, the 3D orientation may also be represented in the form of either 9-elements rotation matrix or its 4-elements compression to quaternion or rotation vector (RV).

One way of determining orientation may be by using gyroscope 1660, accelerometer 1655 and magnetometer 1665 output in Kalman filter equations. Embodiments of the invention may also use an alternative implementation for determining the Rotational Vector from the gravity vector and the (gyroscope-aided) filtered magnetic vector. The two vectors' cross-product may yield a horizontal vector pointing East and the cross product with the gravity vector may in turn yield a horizontal vector pointing North. Each of these 3 vectors: vertical Gravity, horizontal east, and horizontal north may constitute one column of the 3*3 rotation matrix that can be output as is or compressed to Rotational Vector.

Embodiments of the invention include independent filters for accelerometer 1655 (gravity vector filter) and magnetometer 1665 (magnetic vector filter) instead of using a single filter. By separating out the input from the accelerometer 1655 and the magnetometer 1665, the embodiments of the invention can use adaptive filters that adjust the gain and window allowing for faster and more accurate results from the sensors. Additionally, when the device 1600 is stationary the gyroscope 1660, magnetometer 1665 and some filters can be transitioned to a lower power state. Aspects of the invention, also include techniques for increasing accuracy for determining linear acceleration by using a non-normalized gravity vector and providing a mechanism for the application layer to derive the fourth component of a quaternion system.

Independent Gravity Vector Filter and Magnetic Vector Filter:

Many sensor fusion systems use a single filter to process all sensor inputs in combination to remove error. A Kalman filter may be used for removing noise and other inaccuracies to produce values that tend to be closer to the true values of the measurements by observing measurements over a time period (determined by a time constant). FIG. 1 is a block diagram that illustrates a system for filtering the output of an accelerometer 1655, gyroscope 1660 and a magnetometer 1665 using a single filter. However, these filter systems may be difficult to calibrate with accuracy since changing the different calibration parameters have different effects for filtering different sensors. For instance, an accelerometer (for finding the gravity vector) and a magnetometer (for finding the magnetic vector) may associate different environmental factors as noise. Therefore, during any given period of time noise for an accelerometer may be different than noise for a magnetometer. In such a system, a large static time constant for the window used for the filter may be required to properly remove error from both the accelerometer and magnetometer output.

Figure 2A:
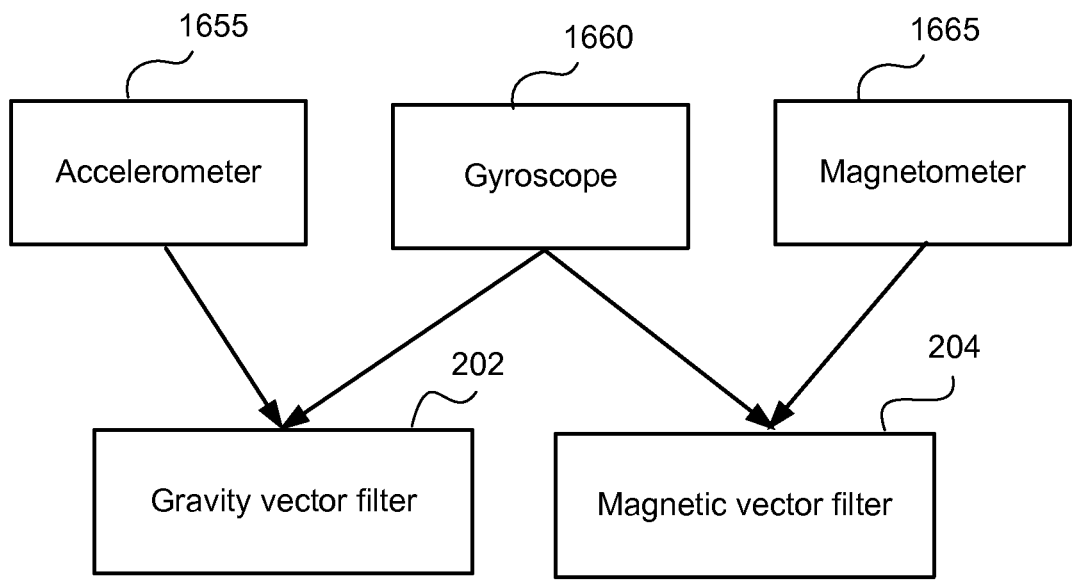
FIG. 2A is a simplified block diagram that illustrates a non-limiting exemplary system for filtering the output of an accelerometer and magnetometer using a plurality of filters.

FIG. 2A is a block diagram that illustrates a system for filtering the output of an accelerometer 1655 and a magnetometer 1665 along with a gyroscope 1660 using separate filters. Embodiments of the invention, process the accelerometer data and the gyroscope data together at a gravity vector filter 202 for determining the gravity vector. A processor such as the processor 1610 illustrated in FIG. 16 or a controller or a component of gravity vector filter 202 may be used in processing the sensor data. Embodiments of the invention, may also process the magnetometer data and the gyroscope data together at a magnetic vector filter 204 to determine the magnetic vector. A processor such as the processor 1610 illustrated in FIG. 16 or a controller or a component of magnetic vector filter 204 may be used in processing the sensor data. In some embodiments of the invention, an adaptive filter is used that allows dynamically adjusting of one or more parameters of the adaptive filter using the processor 1610, a controller or components of the filter. In one embodiment, the adaptive filter may be a Kalman filter.

Gravity Vector Filter:

For the gravity vector filter 202, samples or output data from the sensors 1650 are accumulated over a time period dictated by a time constant for the filter and filtered through a gravity vector filter 202 to derive the gravity vector. Filtering data through a filter may include processing the data at a processor 1610, a controller, application specific integrated circuit (ASIC) or any other digital or analog logic on the device 1600. The gravity vector filter 202 may be implemented in hardware or executing software on a processor 1610, and/or temporarily stored in working memory 1635. Time constant may also be referred as a window size for the filter, and may be used interchangeably throughout the specification. One or more signal parameters from the accelerometer 1655 or/and the gyroscope 1660 may act as noise and may have a detrimental effect in determining the gravity vector. Hereafter, noise associated with the gravity vector filter 202 may be used broadly to include any signal parameters besides the gravity vector itself that may be detrimental in determining the gravity vector. In some instances, these signal parameters, may include but are not limited to actual measurement noise, sensor calibration errors and estimated level of linear acceleration. Noise may be contributed from the errors in calibration of the sensors or noise in the environment. Linear acceleration may also be referred to as translational acceleration, and may be used interchangeably, throughout the specification.

An accelerometer 1655 may work on the principal of measuring the force in the various directions. When the device 1600 and consequentially the coupled accelerometer 1655 are in motion, the force from the gravity field and the acceleration may be indiscernible and the accelerometer 1655 may not be able to tell one from the other. The purpose of the gravity vector filter 202 may be to find the gravity vector, as opposed to linear acceleration for example, and therefore linear acceleration may be noise since it may detract from obtaining the true gravity vector. When the device 1600 is in motion, acceleration of the device 1600 can be treated as noise.

In particular, when the device 1600 is stationary, the device 1600 experiences less noise and the gain of the gravity vector filter 202 can be increased to reduce the settle time for the gravity vector filter 202. When the device 1600 is in motion there is greater successive filter error and samples over a longer period of time may be used to derive the gravity vector. The noise significantly reduces when the device 1600 is stationary and gravity vector filtering with shorter time constant is possible. A device, such as the device 1600 described in FIG. 16, may be stationary for a few brief moments due to the user sitting down with the device 1600 in his/her pocket or keeping the device 1600 on a table for a few brief moments.

The stationary position of the device 1600 can be discerned from the output of the accelerometer 1655, the gyroscope 1660, the magnetometer 1665 or using any other sensor output. When the device 1600 is in a stationary position there is less noise, and samples over a shorter period of time (i.e. shorter time constant) with higher gain are sufficient in deriving the gravity vector from the gravity vector filter 202. In other words, the output of the filter settles much faster since the error is written off faster. For example, calculations of the gravity vector performed when the device 1600 is stationary may largely be attributed to the relative dynamics of the device 1600, in contrast to the noise or sensor error typically observed during an extended time period and/or while the device 1600 is in motion. When the device 1600 is in motion the error may be substantial and it may take the filter much longer to settle the output. However, when the device 1600 is stationary, the error may be much smaller and the gain can be increased while decreasing the time constant for the filter. When the time constant is decreased, sensor errors from the gyroscope 1660 can be reduced or eliminated. Therefore, the gravity vector can be found faster and with the same or better accuracy, by detecting that the device 1600 is stationary and adjusting the time constant and the gain for the filter. Thus, a processor such as the processor 1610 illustrated in FIG. 16 or a controller or component of the gravity vector filter 202 may adjust an operating parameter(s) of the filter, for example a time constant, and/or gain of the filter. The adjustment may be performed in response to detecting that the device 1600 is stationary, detecting a reduction in noise, or detecting another change in a status, signal, or variability of a signal of the device 1600 or sensors 1650 thereof.

The adjustment to the operating parameter for the gravity vector filter 202 may be determined in any number of ways. In one embodiment, the adjustment is roughly proportional to a level of motion of the device 1600. Thus, the time constant may be continually or constantly adjusted by the processor 1610 or a controller. In another embodiment, the adjustment is determined by looking up a motion state of the device 1600 in a table, by the processor 1610 or a controller, and determining a corresponding adjustment based on the lookup state. For example, a first time constant may be used when the device 1600 is in motion, and a second time constant may be used when the device 1600 is substantially stationary. For instance, in one aspect, the first time constant when the device 1600 is in motion may be 5 seconds, and the second time constant when the device 1600 is in substantially stationary position may be 1.4 seconds. Furthermore, a third time constant may be used when the device 1600 is absolutely stationary. In one aspect, the third constant may be 0.6 seconds. Such an exemplary table may be dynamically or statically generated and stored in the Storage device 1625 and temporarily loaded in the working memory 1635 for access.

Figure 2B:
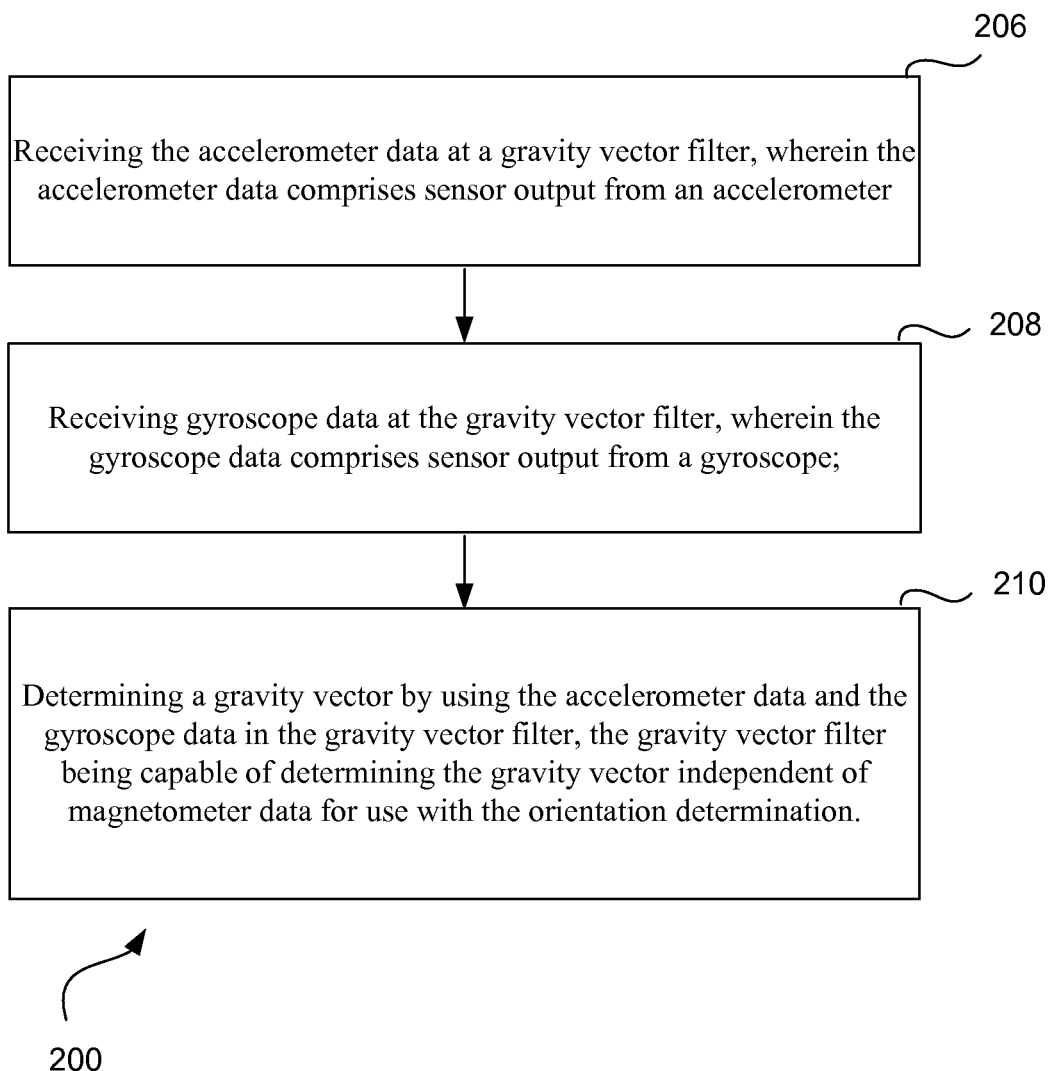
FIG. 2B is a simplified flow diagram illustrating a non-limiting example for determining the gravity vector.

FIG. 2B is a simplified flow diagram illustrating a non-limiting example for determining the gravity vector. The process 200 may be performed by a processor 1610 or processing logic that comprises hardware (circuitry, dedicated logic, etc.), software (such as is run on a general purpose computing system or a dedicated machine), firmware (embedded software), or any combination thereof. In one embodiment, the process 200 is performed by one or more computer systems 1600 as described in FIG. 16. In one embodiment, the sensors 1650 acquire the sensor input for further processing by filtering and processing by components of the device described in FIG. 16.

At block 206, accelerometer data may be received at a gravity vector filter 202, wherein the accelerometer data comprises sensor output from an accelerometer 1655. In some embodiments, block 206 may be performed by components of the device 1600, such as a receiver or other interface (not shown) coupled to the gravity vector filter 202 for receiving sensor data. At gyroscope data may be received at the gravity vector filter 202, wherein the gyroscope data comprises sensor output from a gyroscope 1660. In some embodiments, block 208 may be performed by components of the device 1600, such as a receiver or other interface (not shown) coupled to the gravity vector filter 202. At block 210, components of the device, such as the gravity vector filter 202 may determine the gravity vector by using the accelerometer data and the gyroscope data in the gravity vector filter, wherein the gravity vector may be used for determining the orientation of the computing device. In one embodiment, the gravity vector filter 202 may be capable of determining the gravity vector independent of magnetometer data for use with the orientation determination.

It should be appreciated that the specific steps illustrated in FIG. 2B provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 2B may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Magnetic Vector Filter:

Similarly, with respect to devices that use one or more magnetometers 1665 to detect and/or measure changes in magnetic field (e.g., as a form of user input), there may be times when data received from the one or more magnetometers 1665 is not reliable. This may include instances where there is a deviation in gravity and/or where an interfering magnetic field is present. For instance, interfering magnetic field may generated by one or more other electrical components and/or electronic devices. During times such as these, magnetic vector information provided by the one or more magnetometers 1665 may be skewed by such interference.

For a magnetometer 1665, one or more signal parameters from the magnetometer 1665 or/and the gyroscope 1660 may act as noise in determining the magnetic vector. The signal parameters that are detrimental in determining the magnetic vector may be different than the signal parameters detrimental in determining the gravity vector. Hereafter, noise associated with the magnetic vector filter 204 may be used broadly to include any signal parameters besides the magnetic vector itself that may be detrimental in determining the magnetic vector. In some instances, these signal parameters, may include but are not limited to the sensor calibration errors and an estimated magnetic transient field (i.e. transient anomalies in the magnetic field). The magnetic vector filter 204 attempts to filter out these errors and anomalies, wherein the filter may be implemented in hardware or executing software on a processor 1610, and/or temporarily stored in working memory 1635. In the case of accelerometer 1655, as discussed above, the motion of the device 1600 may contribute to the noise. However, the magnetometer 1665 may not be affected by motion. Instead, the magnetometer 1665 readings may be affected by the magnetic anomalies and magnetic transient fields. Therefore, if no magnetic anomalies are detected, than the gain can be increased and the time constant for the magnetometer 1665 can be reduced. Higher gain with lower noise results in error accumulated in the device's magnetic environment to be read off faster. For instance, if there are large trucks driving by, contributing noise to the magnetic field, the time constant can be dynamically reduced during the time between the driving by of the trucks. The presence of transient magnetic filed may be determined by checking measured and filtered magnetic vector parameters such as magnitude and inclination from the horizon and stability (variance) over time. Thus, a processor such as the processor 1610 illustrated in FIG. 16 or a controller or component of the magnetic vector filter 204 may adjust an operating parameter(s) of the filter, for example, a time constant, and/or gain of the filter. Additionally, the above parameters may be compared against standard earth magnetic field model parameters for current user location. The user location needs to be known with an accuracy of 10-20 miles and can be obtained using GNSS, cell ID or manual position entry.

Another benefit of having higher gain and shorter time constants for filters where the noise is lower is that it allows for lower error introduced by the gyroscope 1660. The gyroscope 1660 may make the fusion sensors output smoother and accurate; however, if the gyroscope 1660 calibration has errors then the orientation error contribution from the gyroscope 1660 could be estimated approximately by multiplying the gyroscope 1660 offset by (time) constant. The error measured using the gyroscope 1660 may accumulate and the gyroscope 1660 may pull the filter sideways over a larger window of time. Therefore, a shorter time constant may lead to a smaller error contribution from the gyroscope 1660. A long time constant may be used, however, when there is significant noise for accelerometer 1655 and/or magnetometer 1665 reading. The gravity vector filter 202 may use the readings from the accelerometer 1655 and the gyroscope 1660, whereas the magnetic vector filter 204 may use the readings from the magnetometer 1665 and the gyroscope 1660. Using a smaller time constant for the gravity vector filter 202 and the magnetic vector filter 204 may reduce the error introduced by the gyroscope 1660 by a factor of the time constant.

Creating and/or implementing independent filters may be especially beneficial since the environmental or other source of these various signal parameters that are detrimental in deriving the gravity vector using the accelerometer 1655 and the magnetic vector using the magnetometer 1665 may be different. For example, the gravity vector filter 202 and the magnetic vector filter 204 can dynamically use different and shorter time constants associated with the filter depending on the detrimental signal parameter or noise detected from the environment using the sensors. For instance, a stationary device 1600 may have very little associated noise or detrimental signal parameters for calculating the gravity vector and therefore a smaller time constant may be used. And the window size for the gravity vector filter 202 may be adjusted independent of the amount of transient magnetic field in the environment. Similarly, the gain or in other words, the frequency of measurements that are allowed to pass through the filter or that are operated on by the filter may be increased during times of low detractive signal parameters for the gravity vector filter 202 and the magnetic vector filter 204, independent of each other.

In some embodiments, even though the accelerometer 1655 and the magnetometer 1665 outputs from the sensors 1650 are separated for the purposes of determining the gravity vector and magnetic vector, respectively, the accelerometer 1655 may still be used as an input to the magnetic vector filter 204. For example, the accelerometer data may aid the magnetic filter by providing motion information to the magnetic vector filter 204 for the purpose of saving power or more efficiently calculating the magnetic vector. The accelerometer data from the accelerometer 1655 may also aid power saving techniques for the gyroscope 1660 and the magnetometer 1665, as further discussed in FIGS. 9 and 10.

Figure 2C:
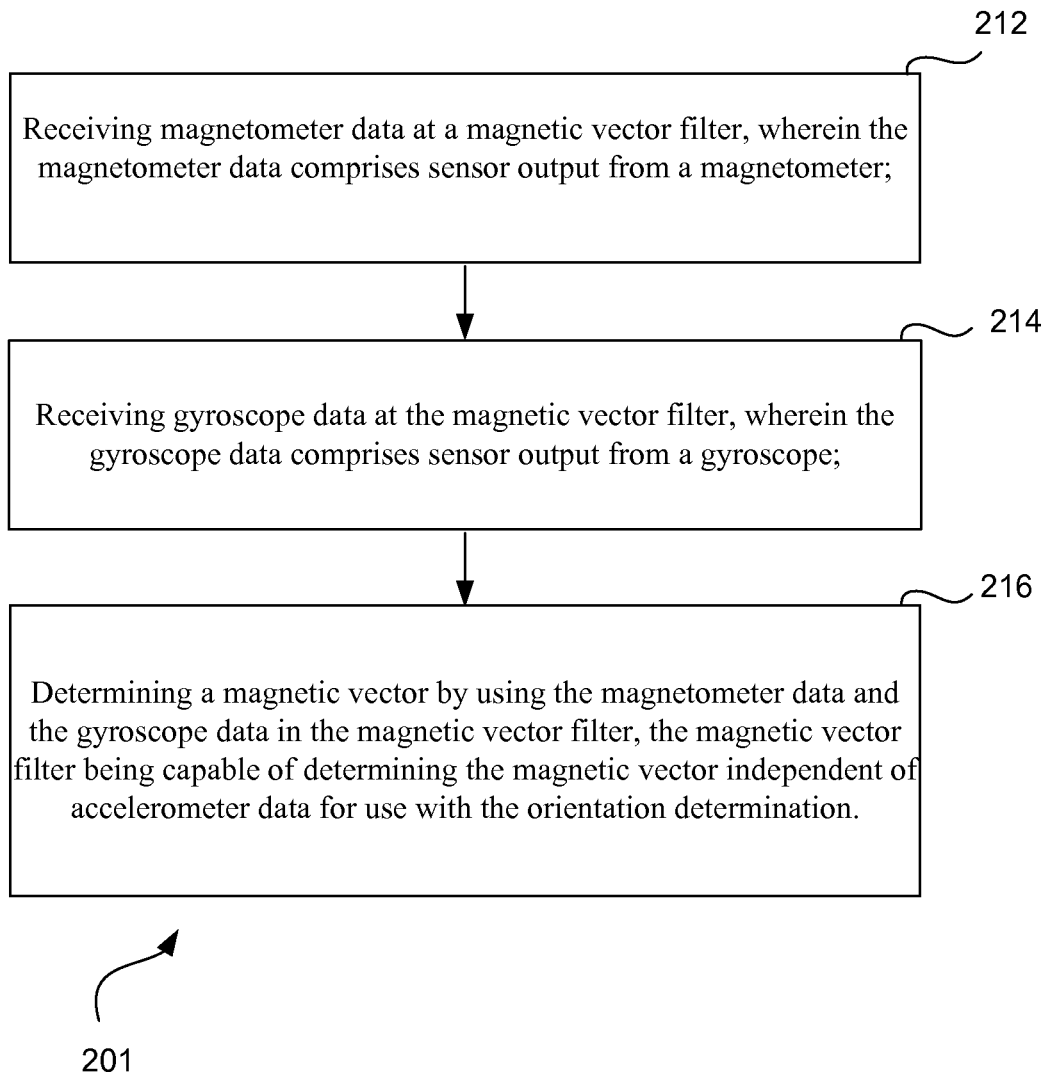
FIG. 2C is a simplified flow diagram illustrating a non-limiting example for determining the magnetic vector.

FIG. 2C is a simplified flow diagram illustrating a non-limiting example for determining the magnetic vector. The process 201 may be performed by a processor 1610 or processing logic that comprises hardware (circuitry, dedicated logic, etc.), software (such as is run on a general purpose computing system or a dedicated machine), firmware (embedded software), or any combination thereof. In one embodiment, the process 201 is performed by one or more computer systems 1600 as described in FIG. 16. In one embodiment, the sensors 1650 acquire the sensor input for further processing by filtering and processing by components of the device described in FIG. 16.

At magnetometer data may be received at the magnetic vector filter 204, wherein the magnetometer data comprises sensor output from a magnetometer 1665. In some embodiments, block 212 may be performed by components of the device 1600, such as a receiver or other interface (not shown) coupled to the magnetic vector filter 204 and configured for receiving sensor data. At gyroscope data may be received at the magnetic vector filter 204, wherein the gyroscope data comprises sensor output from a gyroscope 1660. In some embodiments, block 214 may be performed by components of the device 1600, such as a receiver or other interface (not shown) coupled to the magnetic vector filter 204. At block 216, components of the device, such as the magnetic vector filter 204 may determine the magnetic vector by using the magnetic vector data and the gyroscope data in the magnetic vector filter, wherein the magnetic vector may be used for determining the orientation of the computing device. In one embodiment, the magnetic vector filter 204 may be capable of determining the magnetic vector independent of accelerometer data for use with the orientation determination.

It should be appreciated that the specific steps illustrated in FIG. 2C provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 2C may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 3:
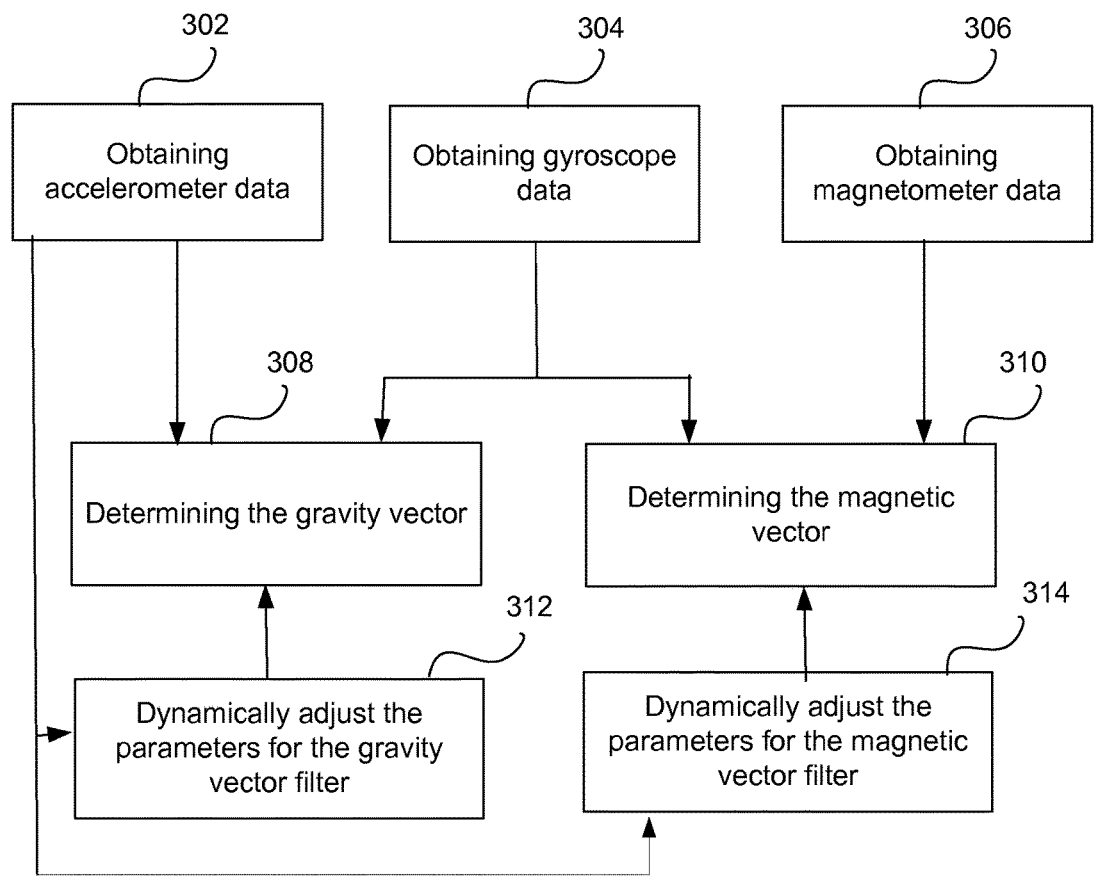
FIG. 3 is a simplified flow diagram illustrating a non-limiting example for acquiring improved orientation data.

FIG. 3 is a simplified flow diagram illustrating a non-limiting example for acquiring improved orientation data. The process 300 may be performed by a processor 1610 or processing logic that comprises hardware (circuitry, dedicated logic, etc.), software (such as is run on a general purpose computing system or a dedicated machine), firmware (embedded software), or any combination thereof. In one embodiment, the process 300 is performed by one or more computer systems 1600 as described in FIG. 16. In one embodiment, the sensors 1650 acquire the sensor input for further processing by filtering and processing by components of the device described in FIG. 16.

At block 302, the accelerometer 1655 and other modules coupled to the computing device 1600 obtain accelerometer data. At block 304, the gyroscope 1660 coupled to the computing device 1600 obtains the gyroscope data and at block 306, the magnetometer 1665 obtains magnetometer data. Similarly, at block 304, the gyroscope 1660 and other modules coupled to the computing device 1600 obtain the gyroscope data. Other sensors 1650, not shown, may also be used in determining orientation of the device.

At block 308, the gravity vector filter 202 determines the gravity vector, using at least the accelerometer data and the gyroscope data, wherein the gravity vector is used for determining the orientation of the device 1600. The gravity vector filter 202 may use an adaptive filter, and may be implemented in software, firmware or hardware, using components of the device 1600, discussed in FIG. 16. At block 312, at least one filter parameter of the adaptive filter may be dynamically adjusted, by a processor 1610 or a controller, using the signal parameters from the one or more sensors. In FIG. 3, at block 312, for illustration purposes, the accelerometer data is used in determining the at least one filter parameter for the gravity vector filter 202. Although, not shown in FIG. 3, some embodiments may also use the gyroscope data, magnetometer data and/or any other sensor data available in adjusting the parameters for the gravity vector filter 202. The filter parameter for the gravity vector filter 202 may be adjusted in response to detecting a change or variability in the signal parameters other than the gravity vector, such as noise, that are detrimental in determining the gravity vector.

At block 310, the magnetic vector filter 204 helps determine the magnetic vector, using at least the magnetometer data and the gyroscope data, wherein the magnetic vector is used for determining the orientation of the device 1600. As further illustrated in FIGS. 4 and 5 and discussed in FIG. 6, the gyroscope-aided magnetic vector filter 204 also allows for a method for performing magnetic anomaly rejection. The magnetic vector filter 204 may use an adaptive filter and may be implemented in software, firmware or hardware, using components of the device 1600, discussed in FIG. 16. At block 314, at least one filter parameter of the adaptive filter may be dynamically adjusted, by the processor 1610 or a controller, using the signal parameters from the one or more sensors. In FIG. 3, at block 312, for illustration purposes, the accelerometer data is used in determining the at least one filter parameter for the gravity vector filter 202. Although, not shown in FIG. 3, some embodiments may also use the gyroscope data, magnetometer data and/or any other sensor data available in adjusting the parameters for the magnetic vector filter 204. The filter parameter for the magnetic vector filter 204 may be adjusted in response to detecting a change or variability in the signal parameters other than the gravity vector, such as noise, that are detrimental in determining the gravity vector.

In some embodiments of the invention, the adaptive filter associated with the gravity vector filter 202 or the magnetic vector filter 204 may use a Kalman filter to allow for adjusting of the parameters. Examples of the adaptive parameters of the adaptive filter may include, but are not limited to the time constant and the gain of the adoptive filter.

As discussed in detail above, with respect to FIG. 2A, separating out the determination of the gravity vector and the magnetic vector may be advantageous, since the signal parameters that are detrimental in determining the respective vectors, such as noise, associated with the gravity vector and the magnetic vector are different. By separating out the determination process, the filter parameters for the gravity vector filter 202 and the magnetic vector filter 204 may be adjusted independently, by the processor 1610 or a controller coupled to the device 1600. Independently adjusting the filter parameters allows for finer granularity of changes in the filter parameters. For instance, the time constant for the respective filter may be adjusted specifically based on if the change in signal parameter was detrimental to the gravity vector filter 202 or magnetic vector filter 204.

It should be appreciated that the specific steps illustrated in FIG. 3 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

The magnetic vector filter 204 may receive magnetometer data and gyroscope data for determining the magnetic vector. Data from the gyroscope 1660 may aid the magnetic vector filter in determining and rejecting anomalies in the data received from the magnetometer, as illustrated in FIGS. 4 and 5 and further discussed in FIG. 6

Figure 4:
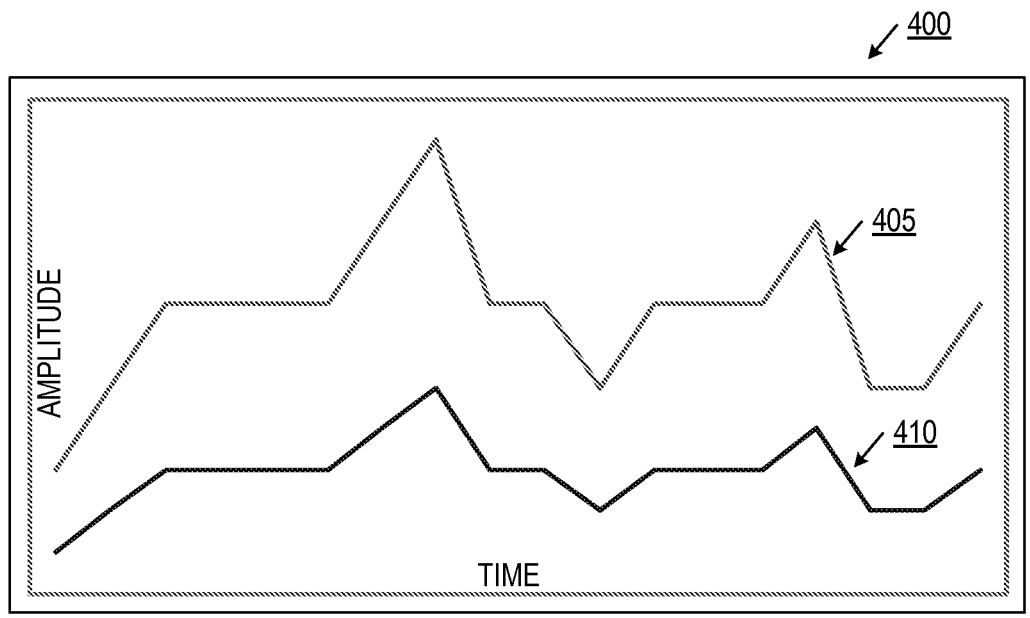
FIGS. 4 and 5 illustrate example graphs in which data received from at least one magnetometer is compared with data received from at least one gyroscope according to one or more illustrative aspects of the disclosure.
Figure 5:
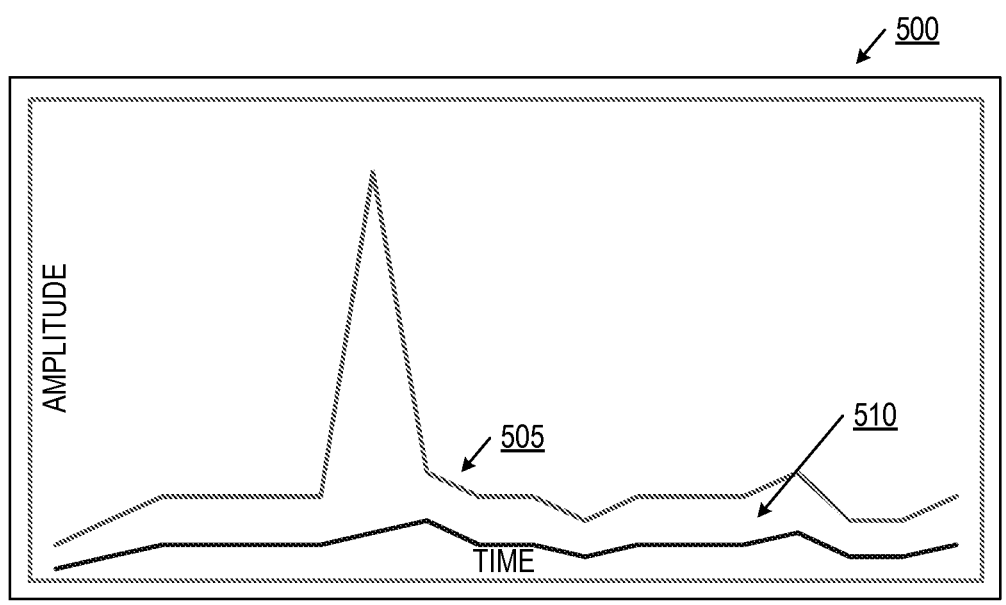

FIGS. 4 and 5 illustrate example graphs in which data received from at least one magnetometer 1665 is compared with data received from at least one gyroscope 1660 according to one or more illustrative aspects of the disclosure. For example, FIG. 4 illustrates an example graph 400 in which line 405 may represent the amplitude of magnetic field measurements (e.g., captured by magnetometer 1665) over a period of time, and further in which line 410 may represent the amplitude of gyroscopic motion measurements (e.g., captured by gyroscope 1660) over the same period of time. In example graph 400, fluctuations in the magnetic field measurements (e.g., as represented by changes in line 405) generally correlate with fluctuations in the gyroscopic motion measurements (e.g., as represented by changes in line 410). Because the fluctuations in the magnetic field measurements correlate with the fluctuations in the gyroscopic motion measurements, it may be determined, based on the gyroscope data, that the magnetic field data does not contain anomalies, because, for instance, it is expected that when computing device 1600 experiences motion, there will be changes in both the gyroscopic motion measurements for the device 1600 (e.g., because the motion may cause changes in the device's 1600 orientation) and the magnetic field measurements for the device 1600 (e.g., because the motion may subject the device 1600 to slightly different gravitational forces, which may, for instance, be associated with changes in the device's 1600 bearing). In one embodiment, the determination is performed by the processor 1610, and may be based on instructions stored and executed from memory 1635.

In example graph 500 of FIG. 5, line 505 may represent the amplitude of magnetic field measurements (e.g., captured by magnetometer 1665) over a period of time, and line 510 may represent the amplitude of gyroscopic motion measurements (e.g., captured by gyroscope 1660) over the same period of time. In contrast to the circumstances illustrated in example graph 400, however, in example graph 500, fluctuations in the magnetic field measurements (e.g., as represented by changes in line 505) might not correlate with fluctuations in the gyroscopic motion measurements (e.g., as represented by changes in line 510). For instance, the spike in line 505, which may represent a sudden change in magnetic field measurements captured by magnetometer 1665, does not correlate with a corresponding change in line 510, which represents the gyroscopic motion measurements. Accordingly, the sudden change in magnetic field measurements may be determined to be an anomaly, for instance, using one or more of the methods and/or method steps as further described below. In one embodiment, the determination is performed by the processor 1610, and may be made using instructions stored and executed from memory 1635.

Figure 6:
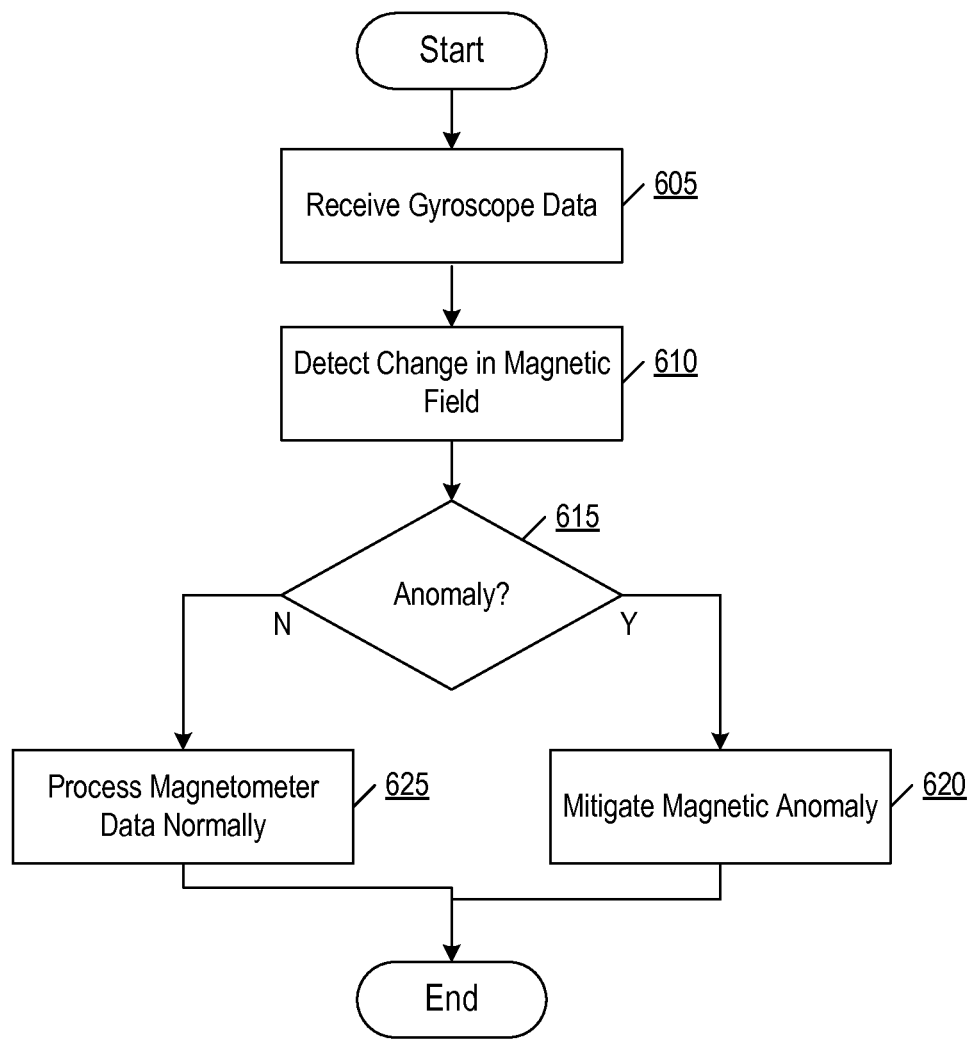
FIG. 6 illustrates a simplified flow diagram illustrating a non-limiting method of performing gyroscope-aided magnetic anomaly rejection according to one or more illustrative aspects of the disclosure.

FIG. 6 illustrates a simplified flow diagram illustrating a non-limiting method of performing gyroscope-aided magnetic anomaly rejection according to one or more illustrative aspects of the disclosure. According to one or more aspects, any and/or all of the methods and/or methods steps described herein may be implemented by and/or in a computing device 1600, such as computing device 1600 and/or the device described in greater detail below, for instance. In one embodiment, one or more of the method steps described below with respect to FIG. 6 are implemented by a processor of the device 1600 such as the processor 1610 or another processor. Additionally or alternatively, any and/or all of the methods and/or method steps described herein may be implemented in computer-readable instructions, such as computer-readable instructions stored on a computer-readable medium such as the memory 1635 or another computer readable medium as described in additional detail below.

In step 605, gyroscope data may be received. In one embodiment, the gyroscope data may include motion data associated with the device 1600. For example, in step 605, computing device 1600 may receive gyroscope data from one or more gyroscopes 1660 included in computing device 1600. In at least one arrangement, the gyroscope data may be received substantially in real-time, such that as the one or more gyroscopes 1660 capture, measure, and output information about movement (e.g., changes in orientation of computing device 1600), the computing device 1600 and/or a processor included therein (e.g., processor 1610) receives, analyzes, and/or otherwise processes such gyroscope data. Gyroscope data encompasses any data perceived, measured, and/or otherwise output by the gyroscope 1660. Gyroscope data is not limited to data acquired while the computing device 1600 is moving. For example, in some embodiments, the step 605 includes determining when the computing device 1600 is substantially stationary, for example using gyroscopic variance. In some embodiments, device stationarity may instead be determined using one or more sensors 1650 other than a gyroscope 1660 in addition to or instead of using the gyroscope 1660. For example, a series of images captured by a camera associated with the device 1600 may be analyzed in some embodiments to determine whether the device is substantially stationary. In other embodiments, ultrasound or IR information may be used.

In step 610, a change in magnetic field may be detected. For example, in step 610, the device 1600 may detect a change in magnetic field based on magnetic field data received from one or more magnetometers 1665 included in device 1600. In at least one arrangement, device 1600 might not detect a change in magnetic field unless the data received from the one or more magnetometers 1665 indicates that a change in magnetic field exceeding a threshold amount has been captured and/or measured.

Subsequently, in step 615, it may be determined, by the processor 1610 or a controller coupled to the device 1600, whether the detected change in magnetic field is a magnetic anomaly. For example, in step 615, device 1600 may determine whether the detected change in magnetic field is a magnetic anomaly based on the received gyroscope data.

In one embodiment, device 1600 may determine (or be configured to determine) that the detected change in magnetic field is an anomaly, in response to and/or when device 1600 determines that the device 1600 is stationary, for example by determining that the gyroscope data received from the one or more gyroscopes 1660 did not identify and/or measure movement during a period of time in which the change in magnetic field was detected. For example, in this embodiment, if a magnetometer 1665 detected a change in magnetic field, but a gyroscope 1660 did not sense a change in position or other movement, then it may be determined that the detected change in magnetic field is a magnetic anomaly. On the other hand, if the magnetometer 1665 detected a change in magnetic field, and the gyroscope 1660 sensed any change in position or movement, then it may be determined that the detected change is magnetic field is not an anomaly.

In another embodiment, different amounts and/or levels of changes in detected magnetic field may be deemed expected and/or acceptable for particular amounts and/or levels of changes in gyroscopic measurement data. Thus, the method 600 may not only be used when the device 1600 is stationary, as discussed above, but also when the device 1600 is moving. For example, a small change in magnetic field detected by a magnetometer 1665 might not be considered a magnetic anomaly when a gyroscope 1660 detected a small change in position and/or orientation at the same moment(s) in time. On the other hand, a large change in magnetic field detected by the magnetometer 1665 may be considered a magnetic anomaly when the gyroscope 1660 only detected a small change in position and/or orientation at the same moment(s) in time.

Furthermore, in this embodiment, different levels of acceptability may be defined for particular amounts of detected change in magnetic field and corresponding amounts of change in gyroscopic measurement data. In this manner, a gradated function may be defined and used in determining whether a particular detected change in magnetic field is a magnetic anomaly. The levels of acceptability, or other such thresholds, may be calculated using the gradated function, for example, or may be determined using a lookup table. The lookup table may be dynamically generated by the processor 1610 or/and stored in the storage device 1625 and temporarily accessed from working memory 1635. For example, the lookup table may define a threshold level of acceptable magnetic change for each of a plurality of gyroscopic measurements.

If it is determined, in step 615, that the detected change in magnetic field is a magnetic anomaly, then in step 620, the magnetic anomaly may be mitigated. For example, in step 620, device 1600 may implement and/or perform one or more techniques to mitigate the magnetic anomaly.

In one embodiment, device 1600 may mitigate a magnetic anomaly by disregarding the magnetic field data received from the magnetometer 1665 that corresponds to the anomaly. For instance, if device 1600 determines that magnetic field information captured during a particular period of time corresponds to a magnetic anomaly, then device 1600 may disregard such information by preventing the information from being used for one or more purposes for which it would ordinarily be used. This may include, for instance, preventing the magnetic field information from being provided to one or more software applications as user input, preventing the magnetic field information from being used in calibrating one or more sensors included in device 1600, and/or the like. In some embodiments, the magnetic filed information may still be reported and/or presented for use, but may be associated with or encoded with a low confidence value. In this way, applications that use the magnetic field information may determine whether and to what extent to rely on or utilize the magnetic field information.

In another embodiment, device 1600 (i.e., processor 1610 or controller logic) may mitigate a magnetic anomaly by increasing a time constant of a filter used to process the magnetic field information. This may have the practical effect of smoothing out the "spike" or other anomalous change in the magnetic field data by averaging the magnetic field data over a larger period of time, thereby "drowning out" the magnetic anomaly in noise. In at least one arrangement, the filter may be a Kalman filter. In one or more arrangements, it may be desirable to smooth out the magnetic field data in this way (e.g., when a magnetic anomaly is detected) to avoid providing incorrect and/or misleading magnetic field information to other software applications. For instance, if misleading and/or otherwise incorrect magnetic field information were provided to other applications as user input, such information may cause the other applications to perform unexpectedly, malfunction, freeze, and/or otherwise inconvenience a user of the device 1600.

As discussed above, techniques of mitigating and/or smoothing out fluctuations in magnetic field information described with respect to the method 600 can be applied not only in stationary scenarios, but also in situations in which the device 1600 may be rotating. In one embodiment, when the gyroscopic measurement data indicates a measured rotation, the magnetic vector may be projected using the rotation information (which may be what the predicted magnetic field would be). If the measured magnetic field deviates too much from the projected prediction, it may be determined at step 615 that the measurement is an anomaly. Subsequently, the time constant of the filters can be increased (or alternatively, the data could be rejected and/or disregarded, as described above) at step 620.

On the other hand, if it is determined, in step 615, that the detected change in magnetic field is not a magnetic anomaly, then in step 625, the magnetic field information provided by the magnetometer 1665 may be processed, by the processor 1610, controller or other logic, normally. For example, in step 625, device 1600 may use the magnetic field information for one or more of a variety of different purposes. Device 1600 may, for instance, provide such magnetic field information to a software application in which the magnetic field information may be treated as user input. In one example, the software application may be a video game, such as a racing game in which a user tilts and/or otherwise moves the device 1600 to drive and steer a vehicle displayed in the video game. In another example, the software application may be a navigation application, such as an interactive map application in which a user is able to turn and/or otherwise move the device 1600 to change the orientation of the map. For instance, the interactive map application may simulate a compass and may use the magnetic field information to determine a bearing of the device 1600.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 7A:
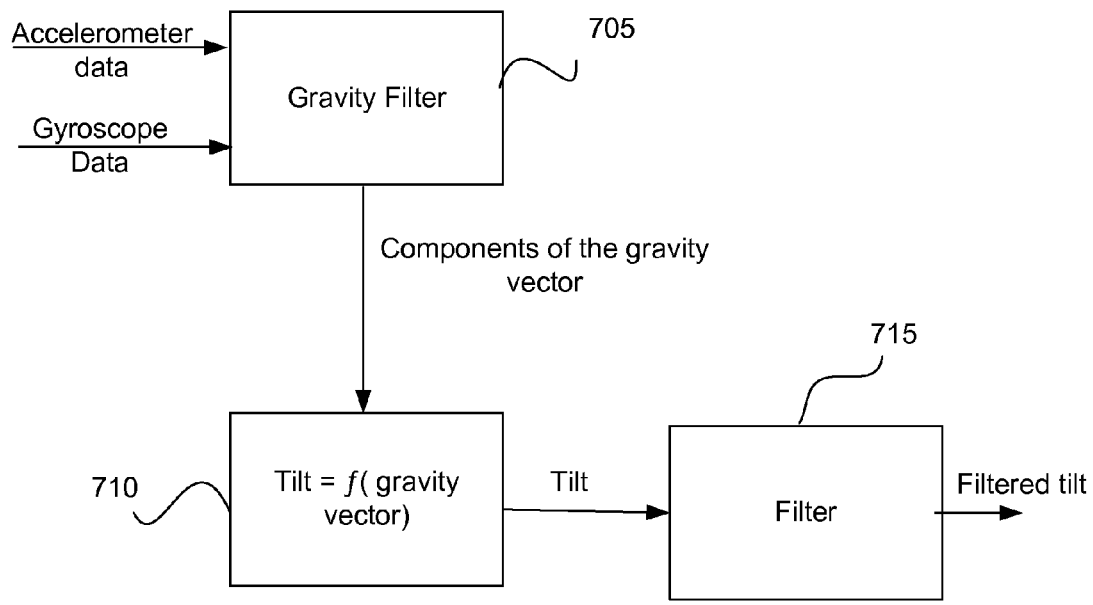
FIG. 7A is a simplified block diagram, illustrating a system for deriving the filtered tilt from the sensor output.

Expanded Gravity Vector Filter:

The gravity vector filter 202 determines the gravity vector. Once the gravity vector is determined the components of the gravity vector are processed through another filter. Furthermore, other functions of the gravity vector may be calculated using the gravity vector. For example, the tilt angle may be derived from a function of the gravity vector. The tilt angle is also filtered. Passing the components and functions of the gravity vector through another filter may add additional time before the output can be used by applications. FIG. 7A is a simplified block diagram, illustrating a system for deriving the filtered tilt from the sensor output. In this system, at block 705, the gravity vector filter 202 derives the components of the gravity vector. At block 710, the gravity vector is processed to derive the tilt, since tilt is a function of the components of the gravity vector. At 715, the tilt derived at block 710 is needs further smoothening and is filtered before it is forwarded to applications for use.

In one embodiment of the invention, an expanded gravity vector filter is used for computing the gravity vector and smoothing out the functions (such as tilt angle) and the gravity vector components simultaneously. Simultaneous processing saves time and provides better performance by eliminating the step of passing the computed tilt angle through another filter before the data is available to the applications. A Kalman filter may be used for the expanded gravity vector filter.

Figure 7B:
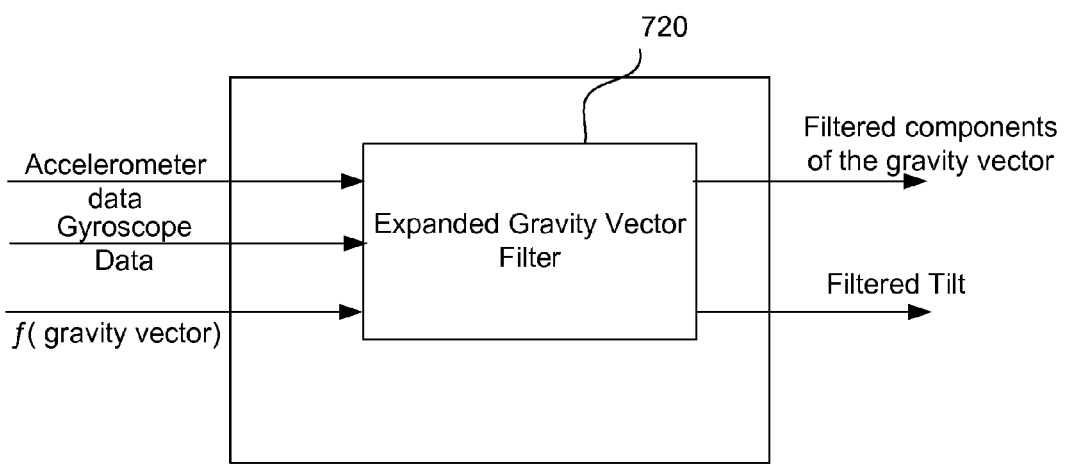
FIG. 7B is a simplified block diagram, illustrating a non-limiting example of an expanded gravity vector filter for calculating the filtered tilt angle and the filtered components of the gravity vector.

FIG. 7B is a simplified block diagram, illustrating a non-limiting implementation of an expanded gravity vector filter 720 for calculating the filtered tilt angle and the filtered components of the gravity vector. In one aspect of the expanded gravity vector filter 720, a Kalman filter or any other adaptive filter may be used. The expanded gravity vector filter 720 may take the function of the gravity vector filter 202 along with the accelerometer data and the gyroscope data as input and output the filtered components of the gravity vector and the filtered tilt angle.

Using the expanded gravity vector filter may result in better smoothing of the computed angles, smaller delays and/or better accuracy that is particularly important for applications such as perspective compensation or jitter correction in a camera or playing games on a device 1600. For instance, while playing a game finding the tilt and reacting to the tilt may make a significant difference in the user experience of playing the game or give the player a competitive advantage in competing online with other players playing on other devices.

Figure 8A:
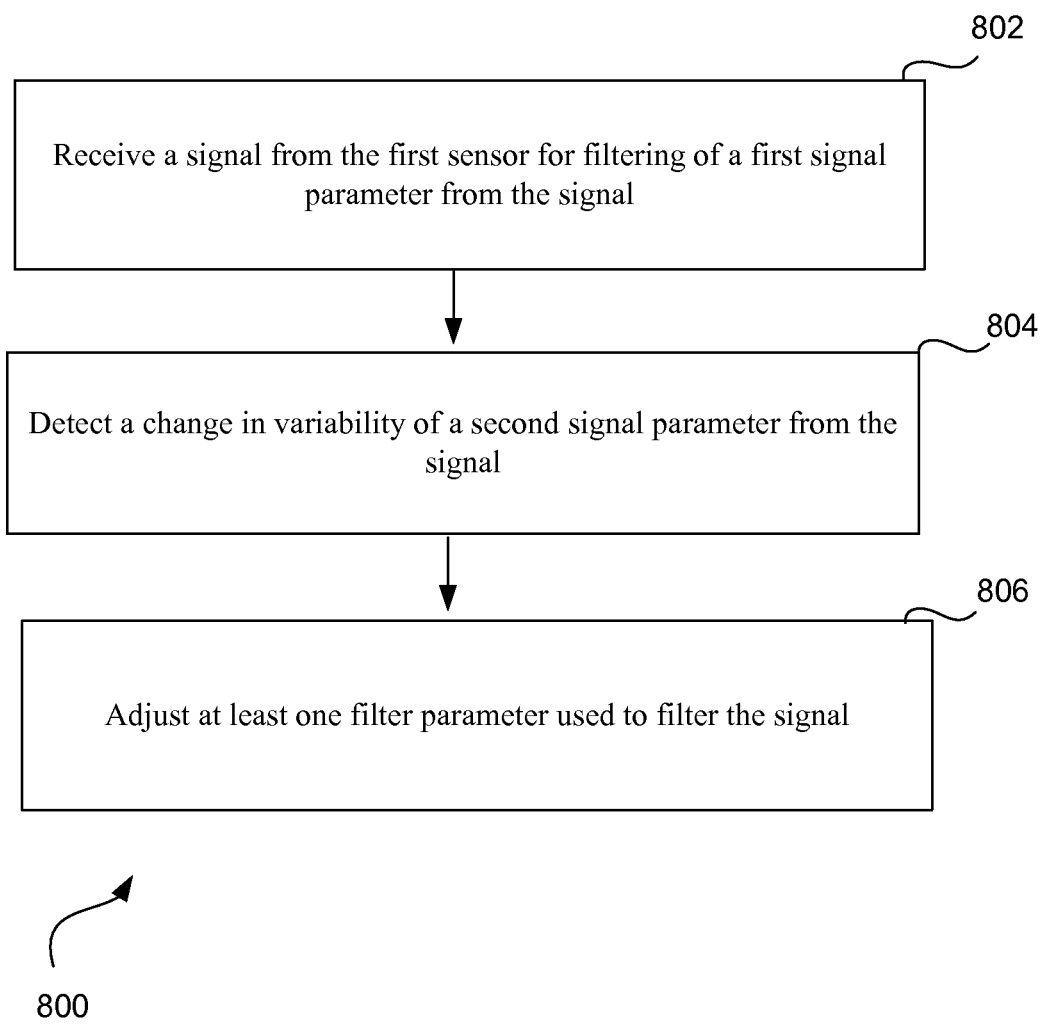
FIG. 8A is a simplified flow diagram illustrating a non-limiting example of a method for improving a filter associated with a sensor.

FIG. 8A is a simplified flow diagram illustrating a non-limiting example of a method for improving a filter associated with a sensor. The process 800 may be performed by a processor 1610 or other processing logic that comprises hardware (circuitry, dedicated logic, etc.), software (such as is run on a general purpose computing system or a dedicated machine), firmware (embedded software), or any combination thereof. In one embodiment, the process 800 is performed by one or more computer devices 1600 as described in FIG. 16. In one embodiment, the sensors 1650 acquire the sensor input for further processing by filtering and processing components of the device described in FIG. 16.

An adaptive filter such as a Kalman filter obtains a plurality of signal parameters comprising a first signal parameter, such as the gravity vector or the magnetic vector and other signal parameters such as noise and errors that are detrimental in deriving the first signal parameter. In some embodiments, for example as discussed with respect to FIG. 2, the accelerometer data and the gyroscope data are processed together in the gravity vector filter 202 and the magnetometer data and gyroscope data are processed together in the magnetic vector filter 204.

At block 802, components of the device 1600, such as a filter, receive a signal from the first sensor for filtering of a first signal parameter from the signal. At block 804, components of the device 1600, such as the filter, detect a change in a variability of a second signal parameter from a plurality of signal parameters from the signal. In one embodiment, the first sensor may be an accelerometer 1655, the first signal parameter may be a gravity vector and the second signal parameter may be a signal parameter other than the gravity vector. The second signal parameter may be one or more of a signal noise, a measurement error, a sensor calibration error or a linear acceleration of the device 1600. In another embodiment, the first sensor may be a magnetometer 1665, the first signal parameter may be the magnetic vector and the second signal parameter may be a signal parameter other than the magnetic vector. The second signal parameter may be one or more of a signal noise, a sensor calibration error or a magnetic transient field.

At block 806, the method performed by components of the device 1600, such as the processor 1610 or a controller coupled to the device 1600, adjust the at least one filter parameter used for filtering the signal. In one embodiment, the at least one filter parameter may include a time constant for the adaptive filter, wherein the time constant for the filter is directly proportional to the variability of the second signal parameter associated with the input data for the filter. The time constant can be dynamically adjusted when there is less noise introduced in the accelerometer 1655 or magnetometer 1665 readings. For example, the method may reduce the time constant for the gravity vector filter 202, in response to detecting that the device is substantially stationary. A substantially stationary device may have a reduced level of noise introduced by linear acceleration for calculating the gravity vector, as discussed in FIG. 2A. Since the accelerometer data associated with a stationary device 1600 may be more accurate than a device in motion, fewer number of data samples may be sufficient in calculating the gravity vector. Therefore, dynamic adjusting of the time constant for the gravity vector filter 202 and similarly, the magnetic vector filter 204 may result in potentially faster and more accurate readings.

In another embodiment, the at least one filter parameter may include a gain for the adaptive filter, wherein the gain for the adaptive filter may be approximately inversely proportional to the variability of the second signal parameter associated with the input data for the filter. For instance, upon detecting that the device 1600 is stationary, components of the device 1600 may also increase the gain or frequency of data sampled. Since the data samples for deriving the gravity vector may be collected with higher confidence while the device 1600 is substantially stationary, a higher number of samples during a shorter period of time (i.e., shorter time constant for the filter) may be sufficient in calculating the gravity vector. A processor such as the processor 1610 illustrated in FIG. 16 or a controller or component of the filter may adjust the one or more signal parameter(s) of the filter, for example a time constant, and/or gain of the filter. In some embodiments, the filter is an adaptive filter and at least one filter parameter of the adaptive filter is dynamically adjustable. In some implementations, the adaptive filter may be a Kalman filter.

It should be appreciated that the specific steps illustrated in FIG. 8A provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8A may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 8B:
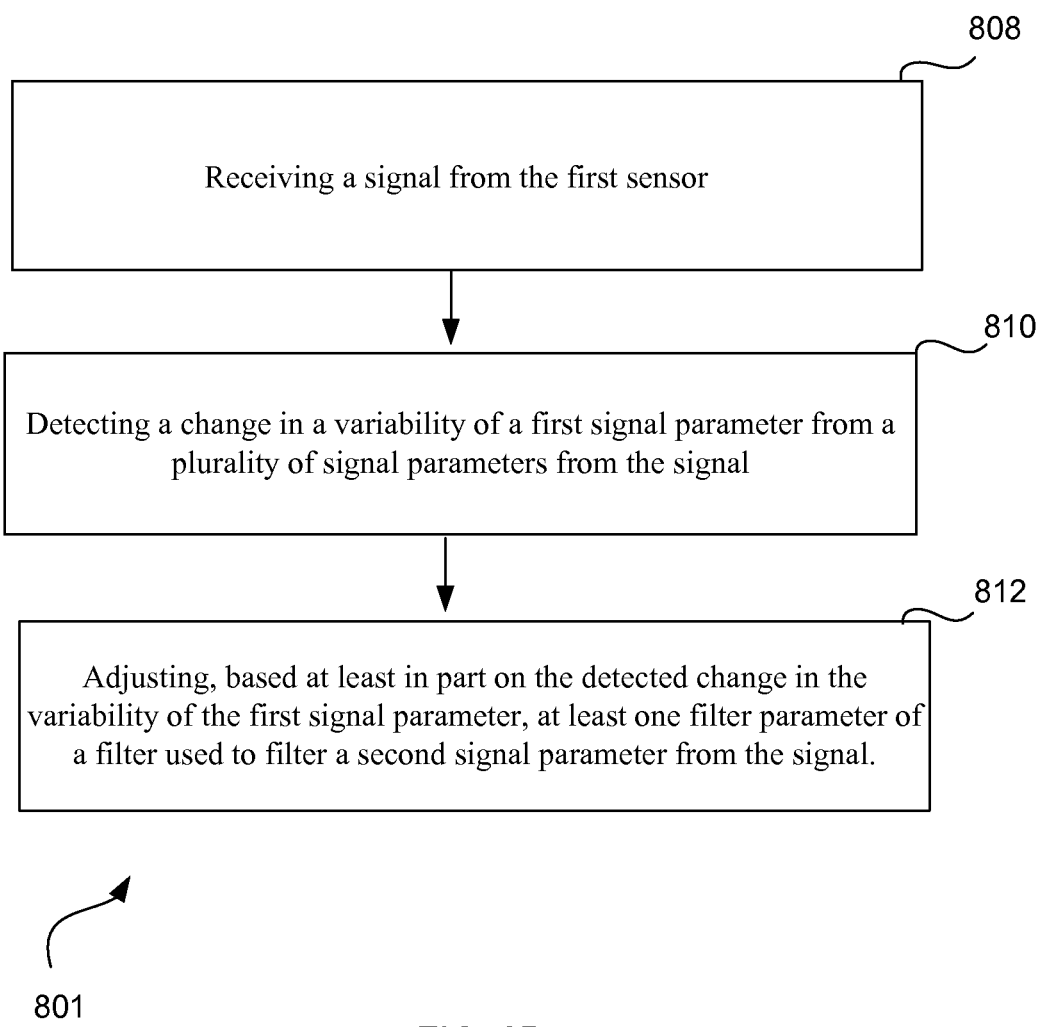
FIG. 8B is a simplified flow diagram illustrating a non-limiting example of a method for improving a filter associated with a sensor.

FIG. 8B is another simplified flow diagram illustrating a non-limiting example of a method for improving a filter associated with a sensor. The process 800 may be performed by a processor 1610 or other processing logic that comprises hardware (circuitry, dedicated logic, etc.), software (such as is run on a general purpose computing system or a dedicated machine), firmware (embedded software), or any combination thereof. In one embodiment, the process 801 is performed by one or more computer devices 1600 as described in FIG. 16. In one embodiment, the sensors 1650 acquire the sensor input for further processing by filtering and processing components of the device described in FIG. 16. Thus, any of the sensor 1650 may comprise the first sensor described below.

An adaptive filter such as a Kalman filter may obtain a plurality of signal parameters comprising a signal parameter (referred to as a second signal parameter in the example illustrated in FIG. 8B), such as the gravity vector or the magnetic vector and other signal parameters such as noise and errors (referred to as a first signal parameter in the example illustrated in FIG. 8B) that are detrimental in deriving the second signal parameter. In some embodiments, for example as discussed with respect to FIG. 2, the accelerometer data and the gyroscope data are processed together in the gravity vector filter 202 and the magnetometer data and gyroscope data are processed together in the magnetic vector filter 204.

At block 808, components of the device 1600, such as a filter, may receive a signal from the first sensor. In some embodiments, the signal may be received at a receiver or other interface (not shown) coupled to the filter and configured for receiving sensor data. At block 810, components of the device 1600, such as the filter, may detect a change in a variability of a first signal parameter from a plurality of signal parameters from the signal. At block 812, at least one filter parameter of a filter used to filter a second signal parameter from the signal may be adjusted based at least in part on the detected change in the variability of the first signal parameter. A processor such as the processor 1610 illustrated in FIG. 16 or a controller or component of the filter may adjust the one or more signal parameter(s) of the filter, for example a time constant, and/or gain of the filter. In some embodiments, the filter may be an adaptive filter and at least one filter parameter of the adaptive filter is dynamically adjustable. In some implementations, the adaptive filter may be a Kalman filter.

It should be appreciated that the specific steps illustrated in FIG. 8B provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 9:
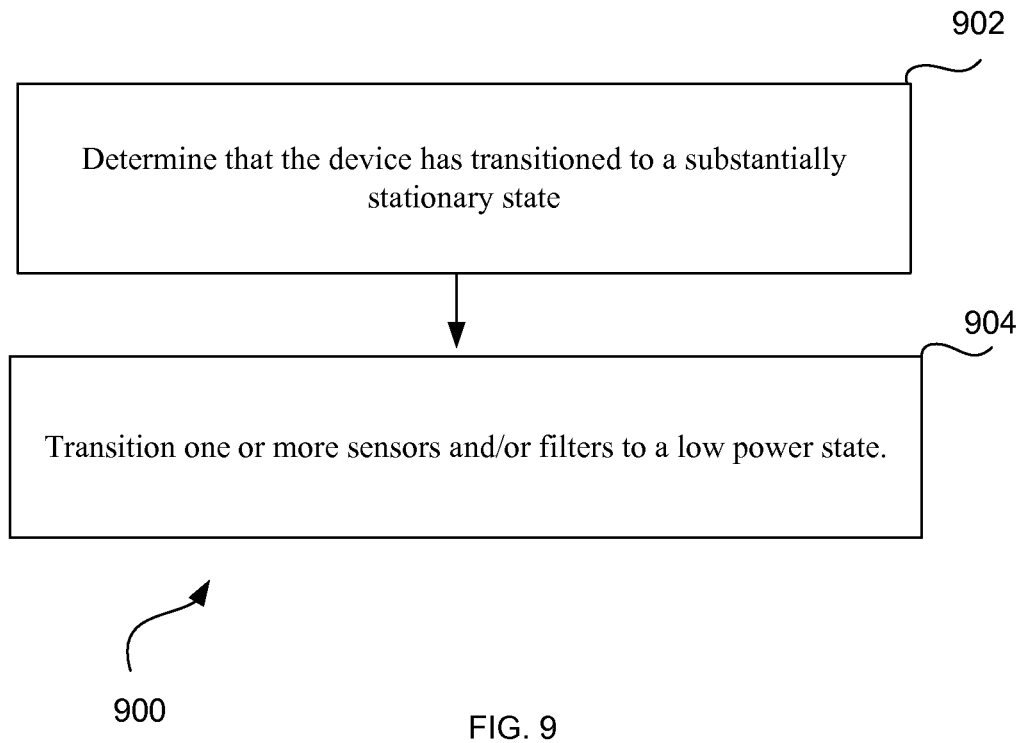
FIG. 9 is a simplified flow diagram illustrating a non-exemplary process for saving power associated with a filter system.

Power Saving by Turning Off the Gyroscope:

FIG. 9 is a simplified flow diagram illustrating a non-exemplary process for saving power associated with a filter system. The process 900 may be performed by processing logic that comprises hardware (circuitry, dedicated logic, etc.), software (such as is run on a general purpose computing system or a dedicated machine), firmware (embedded software), or any combination thereof. In one embodiment, the process 900 is performed by one or more computer devices 1600 as described in FIG. 16. In one embodiment, the sensors 1650 acquire the sensor input for further processing by filtering and processing components of the device described in FIG. 16.

At block 902, components of the device 1600 may determine that the device 1600 has transitioned to a stationary state. In some implementations, such determination may be made using accelerometer data from the accelerometer 1655 or any other sensor data.

At block 904, since the device is substantially stationary, there is no change in the orientation data, and one or more sensors and/or filters for collecting orientation data may be transitioned to a low power state. In some implementations, the one or more sensors may include the gyroscope 1660 and/or the magnetometer 1665. In some implementations, the one or more filters may include the magnetic vector filter 204. Transitioning the one or more sensors and/or filters to a low power state may include switching off or duty cycling the sensors or the filters.

Gyroscopes 1660 may be primarily used for determining orientation data, such as rotational changes. In some implementations, relative to the accelerometer 1655, the gyroscope 1660 drains more power from the device 1600. For power saving, aspects of the invention may turn off the power hungry gyroscope 1660 when the device 1600 is in a stationary or substantially stationary position. When the device 1600 is stationary or substantially stationary there are no rotational changes to compensate and the gyroscope 1660 may not be needed. The gravity vector filter 202 may switch to an accelerometer 1655 only filter. Additionally, as discussed previously, the gyroscope 1660 may contribute to the filter error. When the device 1600 is stationary the gyroscope 1660 can be turned off reducing the filter error. Therefore, turning off the gyroscope 1660 dynamically may save power and increase the accuracy of the output.

Figure 10:
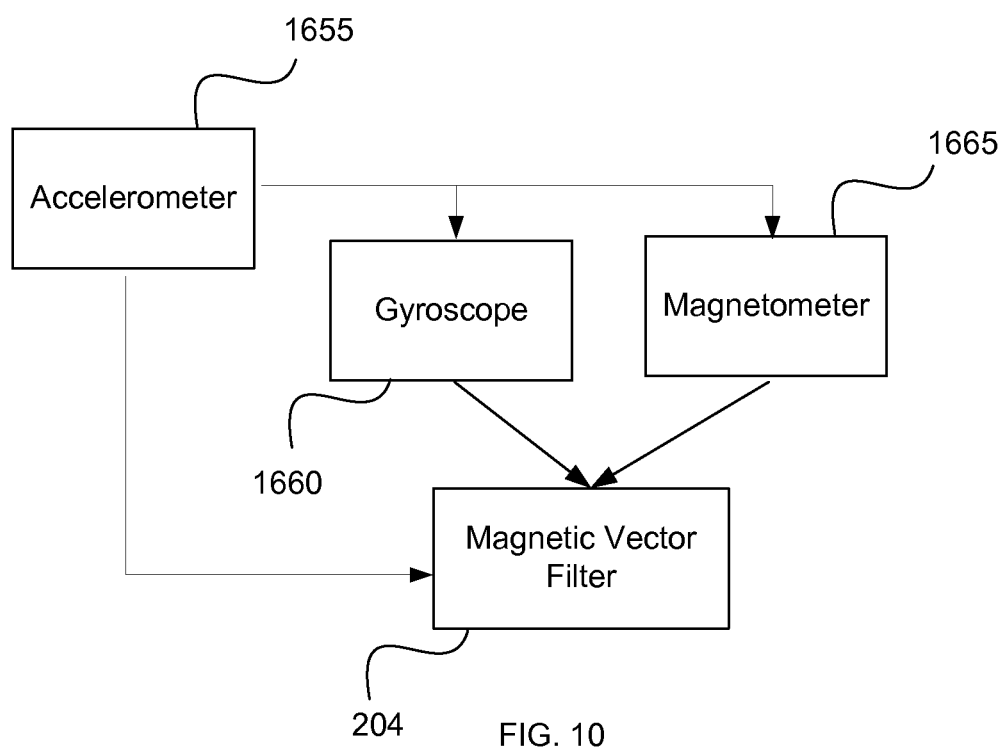
FIG. 10 is a simplified block diagram, illustrating a non-limiting example of an accelerometer aided filter system.

As shown in FIG. 10, the accelerometer data from the accelerometer 1655 may be used in aiding the gyroscope 1660, the magnetometer 1665 or/and the magnetic filter for the purpose of determining if the device 1600 is moving or is stationary for power savings and not for determining orientation data (i.e., gravity vector or magnetic vector). In one embodiment, in addition to transitioning the gyroscope 1660 to a low power state, in response to detecting that the device 1600 is stationary, the magnetometer 1665 and the magnetic vector filter 204 may also be transitioned to a low power device, since when the device 1600 is stationary the orientation of the device 1600 does not change and results from the magnetometer 1665 and the magnetic vector filter may not be needed.

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 11:
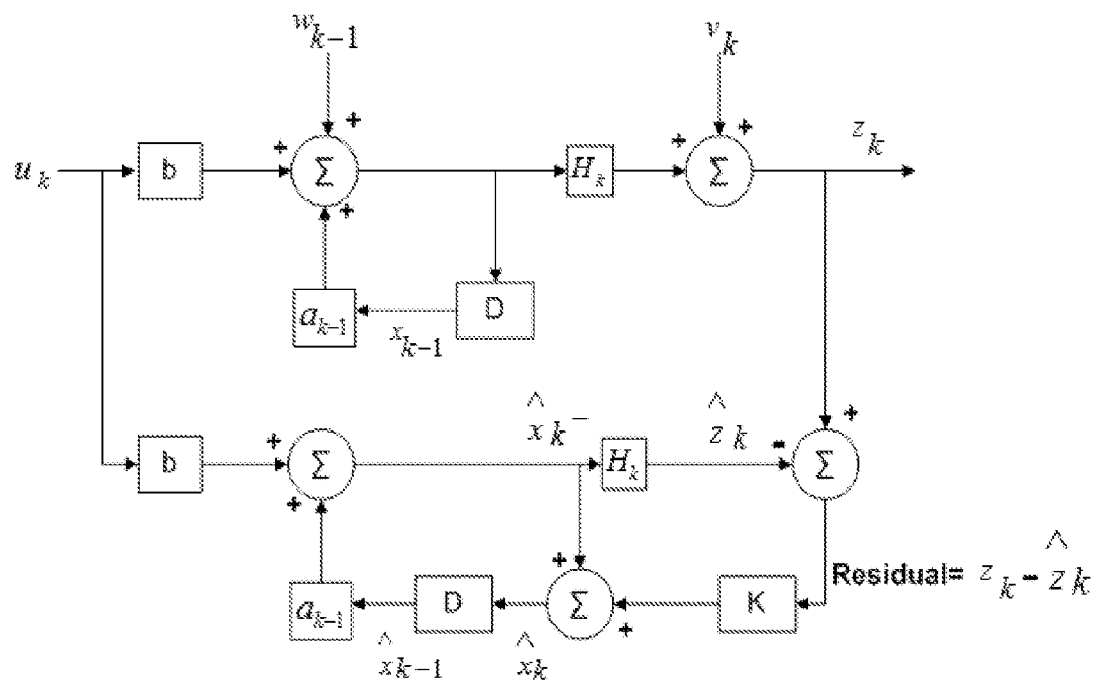
FIG. 11 illustrates an example implementation of a Kalman filter according to one or more illustrative aspects of the disclosure.

Using a Kalman Filter as the Adaptive Filter:

Most traditional solutions for calculating the gravity vector or magnetic vector utilize a first order filter with fixed filter parameters such as time constant and gain. Using an adaptive filter such as a Kalman filter for a gravity vector filter 202 is advantageous since the Kalman filter allows flexibility in the adjustability of the parameters in calculating the gravity and magnetic vector as discussed above. The Kalman filter may be used to remove or compensate for undesirable signal parameters, such as noise, and other inaccuracies to produce values closer to the true values of the measurements by observing measurements over a time period (determined by the time constant). FIG. 11 illustrates an example implementation of a Kalman filter according to one or more illustrative aspects of the disclosure implemented by the device 1600 described in FIG. 16. The difference in performance by using a Kalman filter may be especially pronounced when there are several fast transitions between motion and stationary states.

The Kalman filter based fusion of sensor information may provide optimal gain on each of the fused sensors based on the underlying sensor variance. Another distinct advantage of using the Kalman filter is that the design of the Kalman filter allows weighing the different inputs, by using the noise (i.e., undesirable signal parameter) associated with the input. In essence, the different inputs to the Kalman filter can proportionally have different weights. Thus, the accelerometer 1655 input may be heavily weighed when the there is less noise associated with the accelerometer 1655 input and the gyroscope 1660 input may be heavily relied upon when there is less noise associated with the gyroscope 1660 input. In this manner, the sensor which may be experiencing less noise or is determined to be operating more accurately may be emphasized, while a sensor output associated with high noise may be reduced or eliminated.

In one embodiment, a respective gain used for each of the gyroscope 1660 and the accelerometer 1655 may be independently adjusted. The gain of the sensor that is experiencing the least amount of noise may therefore be increased, and the gain of the sensor experiencing the most amount of noise may be decreased. In some embodiments, the gain is roughly inversely proportional to the estimated undesirable parameters or the adjustment of the gain is approximately proportional to the opposite to the variability of the undesirable signal parameter. Furthermore, traditionally, the gyroscope 1660 and accelerometer 1655 are pre-calibrated before providing input to the gravity vector filter 202.

However, when the Kalman filter is used in a gravity vector filter 202, the gyroscope 1660 and accelerometer 1655 output can be provided directly to the gravity vector filter 202 with the associated undesirable signal parameters, such as noise acting as the weighing parameter, eliminating additional steps needed with traditional implementations of the filters.

The gyroscope offset may also be computed as part of the Kalman filter, making the gyroscope 1660 output available earlier for applications. Having the gyroscope 1660 offset available early is advantageous in scenarios where the application relies on the gyroscope 1660 output. For instance, a camera application needs fast and accurate gyroscope data for applications like perspective compensation in camera images. Further, calculating the offset in the Kalman filter obviates processes for pre-calibrating the gyroscope 1660. Instead, the gyroscope 1660 may be calibrated while running the filter.

The gyroscope offset may be approximately equivalent to the gyroscope output (with a small error that includes random noise) when the device is stationary. Many inexpensive gyroscopes may have offset of many degrees per second at room temperature, plus substantial offset drift over temperature, which may make them practically unusable until the offset has been calibrated out.

When device is stationary, gyroscope offset can be calibrated without any Kalman filter by simply averaging gyroscope 1660 output over stationarity interval. However, in some use cases the offset may need to be calibrated in motion too. E.g. some users rarely place phone stationary on desk, but rather hold it either in hand or in pocket so there is always some motion. In such situations, Kalman filter is useful since it can calibrate the offset in motion. This is because the device orientation is observable from accelerometer 1655 and magnetometer 1665 measurements independently of gyroscope 1660. So if the orientation changes over delta time (dt) computed from accelerometer 1655 and magnetometer 1665 (referred to as dOrientationAM), and the delta orientation from gyroscope (determined by gyroscope 1660 signal integration) (referred to as dOrientationG), then (dOrientationG-dOrientationAM)/dt provides an estimate of the gyroscope 1660 offset. Averaged across multiple measurements the offset estimate may provide a desirable level of accuracy.

Synchronizing the Sensors:

On computing devices, such as device 1600, operating systems provide an interface layer between hardware and applications. The applications utilize the functionality provided by the hardware, such as access to sensor data, through the operating system layer. The operating system may expect input formatted in a particular manner from the hardware and provides API's for the applications for access to data in a unified manner regardless of the underlying hardware. These properties of the operating system can become restrictive in providing accurate sensor data to the applications from the hardware. For instance, the operating system (such as Android) may expect sensor data (rotational/quaternion coordinates) at a unified timestamp. Such restrictions diminish the ability of the hardware in providing rich and accurate sensor data. Embodiments of the invention, performed by components of the device 1600, presents the sensor data to the operating system in a manner expected by the OS, without substantially compromising sensor accuracy.

Figure 12A:
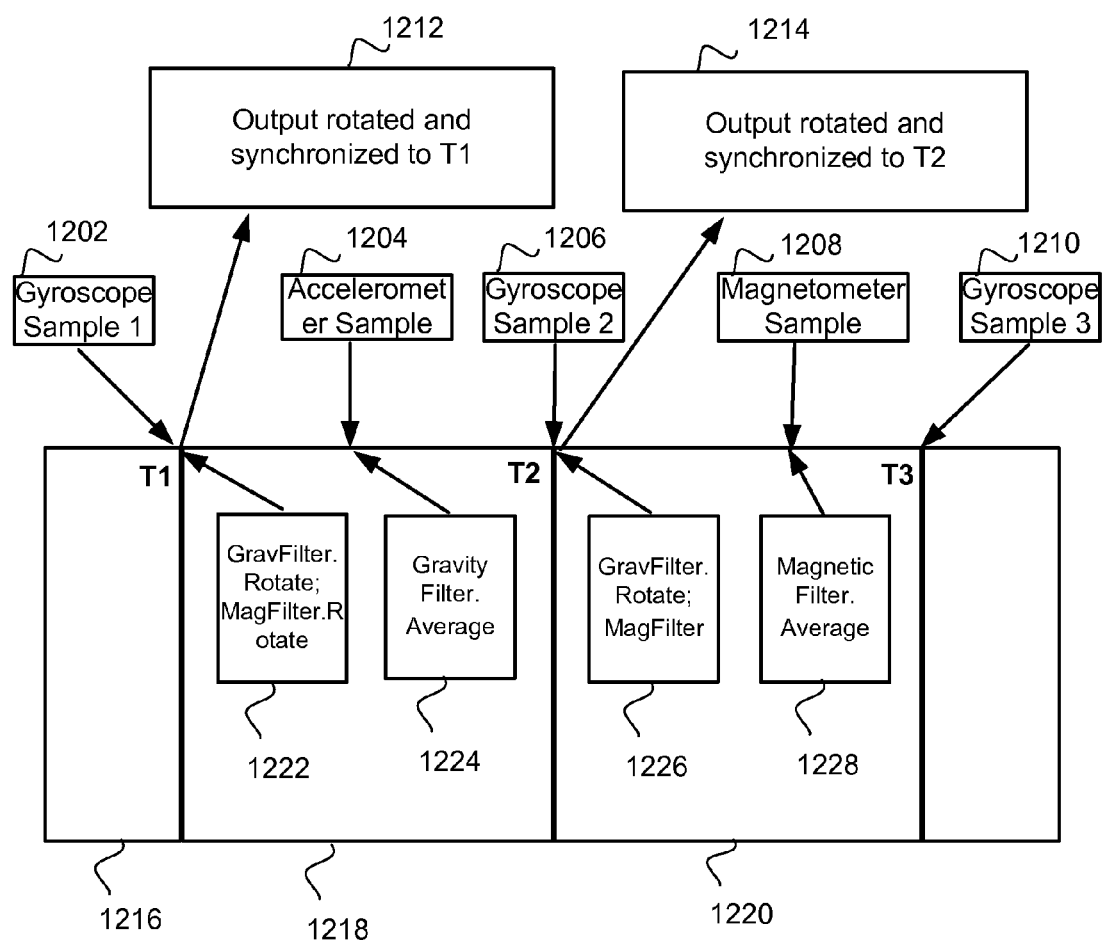
FIG. 12A is a simplified time sequence flow diagram, illustrating a non-limiting embodiment of the invention for synchronizing various sensor inputs.

FIG. 12A is a simplified time sequence flow diagram, illustrating a non-limiting embodiment of the invention for synchronizing the various sources of sensor input. The sequence 1200 may be performed by processing logic that comprises hardware (circuitry, dedicated logic, etc.), software (such as is run on a general purpose computing system or a dedicated machine), firmware (embedded software), or any combination thereof. In one embodiment, the sequence 1200 is performed by one or more computer devices 1600 as described in FIG. 16. In one embodiment, the sensors 1650 acquire the sensor input for further processing by filtering and processing components of the device described in FIG. 16.

The rotation vector and consequently the orientation data is derived from gravity vector filter 202 and magnetic vector filter 204 results. In real systems, sensors may be sampled at different rates. However, it may be desirable for OS frameworks and applications to obtain orientation data derived from the sensor data with a unified timestamp in a synchronized manner.

A unified set of orientation data corresponding to a common time may be presented to the OS framework by aspects of the invention, such as the underlying hardware, firmware and/or software, wherein, the gravity vector filter 202 and magnetic vector filter 204 are updated upon arrival of each gyroscope sample. If accelerometer 1655 and magnetometer 1665 happen to have different sample times from the gyroscope timestamps, the accelerometer 1655 and magnetometer 1665 outputs may be interpolated and synchronized to the gyroscope 1660 time.

FIG. 12A shows three different timezones marked by the arrival of the gyroscope samples. At time T1, the first gyroscope sample 1202 arrives, at time T2, the second gyroscope sample 1206 arrives and at time T3, the third gyroscope sample 1210 arrives. Block 1216 represents the time from T0 to T1, block 1218 represents the time from T1 to T2 and block 1220 represents the time from T2 to T3. Referring to FIG. 12A, at time T1, the gyroscope sample 1202 is received by both the gravity vector filter 202 and the magnetic vector filter 204. As shown at blocks 1212 and 1222, embodiments of the invention may propogate (e.g., rotate in some embodiments) the previous gravity vector filter 202 and magnetic vector filter 204 results from the preceding time T0 to T1. Once the results are synchronized to the gyroscope 1660 timestamp, the output of the gravity vector filter 202 and magnetic vector filter 204 may be output as orientation data to the OS framework, an application, or any other component requesting orientation data. Similarly, as shown at blocks 1214 and 1226, at time T2, previous gravity vector filter 202 and magnetic vector filter 204 results from the preceding time T1 to T2 may be propogated to T2 and synchronized with the gyroscope sample 1206.

The data averaging may be performed, by the processor 1610 or other controller logic, when the sensors are sampled. In FIG. 12A, as shown at block 1224, the accelerometer sample 1204 arrives between T1 and T2. The gravity vector filter 202 averages the accelerometer measurement from T1 to the timestamp of the samples arrival and passes it to the first order filter. Similarly, in FIG. 12A, as shown by block 1228, the magnetometer sample 1208 arrives between T2 and T3. The gravity vector filter 202 averages the accelerometer measurement from T1 to the timestamp of the samples arrival and passes it to the first order filter.

In some implementations, averaging of the gravity filter and the magnetic filter also implies syncronizing with the gyroscope via accelerometer 1655 and magnetometer 1665 propogation to the gyroscope time stamp. For example, the accelerometer sample 1204 may be propogated to gyroscope time T2 and the magnetometer sample 1208 may be propogated to gyroscope time T3.

The data rotation may be performed, by the processor 1610 or other controller logic, at the gyroscope sampling rate. Referring to FIG. 12A, at time T1, the gyroscope sample 1202 is received by both the gravity vector filter 202 and the magnetic vector filter 204. The system propogates the previous gravity and magnetic vector filter 204 result from the preceding time T0 to T1 (as shown at 1212). Once the results are calculated and synchronized to the gyroscope sample timestamp, the Magnitude vector from averaging of the data is output along with the rotation vector. Similarly, at T2 and T3, the accelerometer 1655 and magnetometer 1665 readings are propogated through the respective filters to match the gyroscope timestamp.

In some implementations, the data rotation for the synchronization (propogation) may only be performed when the device is rotating, since while the device is stationary the accelerometer 1655 and magnetometer 1665 measurements are approximately constant regardless of their time stamp when the device is stationary and the data rotation may not be needed. For devices in motion, since the gyroscope 1660 sensor data is available, the propagation may be performed accurately using rotation matrix computed from the gyroscope 1660, similar to the rotation generated for a gravity filter. The only difference may be that rotational matrix for GravFilter.Rotate; MagFilter.Rotate may be computed from gyro(i)*(Tgyro(i)−T(gyro(i−1)), whereas for acceleration propagation to Tgyro for the rotational matrix may be computed from gyro(i)*(Taccel−tgyro(i)).

Therefore, in some embodiments, averaging of the sensors is performed and accumulated as the samples are received from the various sensors and the rotional vector is generated when the gyroscope samples (i.e., 1202, 1206 and 1210) are received. However, the rotational vector and the magnitude are output with a unified timestamp that is synchronized with the rate at which the gyroscope sample is received, thus providing the operating system with the sensor data at a unified timestamp.

It should be appreciated that the specific sequence steps illustrated in FIG. 12A provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 12A may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 12B:
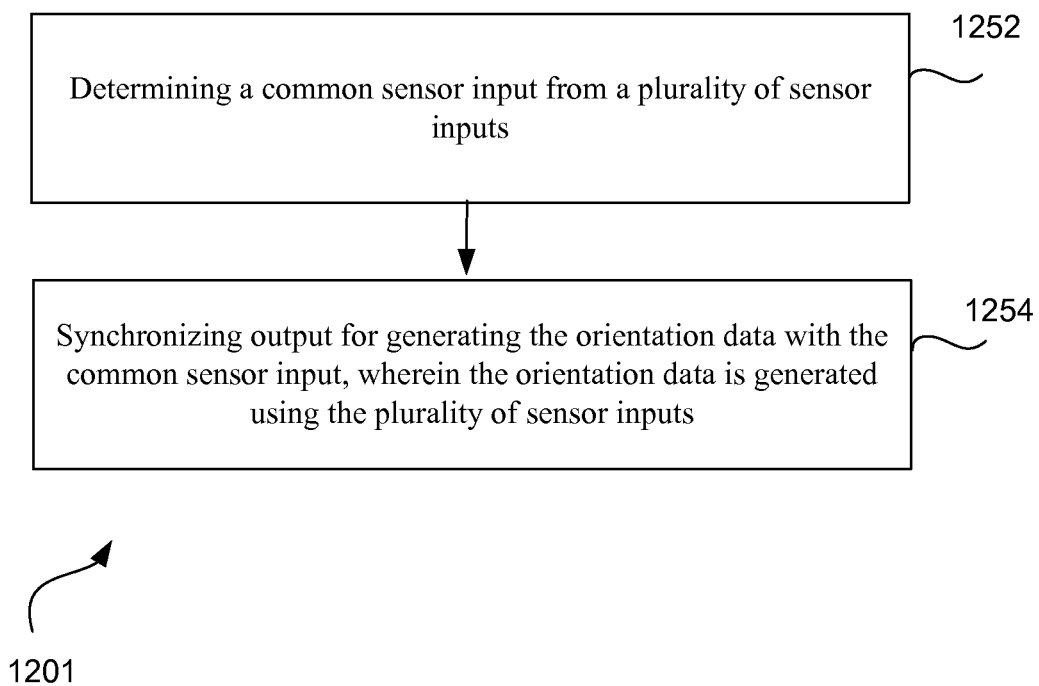
FIG. 12B is a simplified flow diagram illustrating a non-limiting embodiment of the invention for synchronizing the various sources of sensor input.

FIG. 12B is a simplified flow diagram illustrating a non-limiting embodiment of the invention for synchronizing the various sources of sensor input. The process 1201 may be performed by processing logic that comprises hardware (circuitry, dedicated logic, etc.), software (such as is run on a general purpose computing system or a dedicated machine), firmware (embedded software), or any combination thereof. In one embodiment, the process 1201 is performed by one or more computer devices 1600 as described in FIG. 16.

At block 1252, methods performed by components of the device, such as processing logic or filter, determine a common sensor input from a plurality of sensor inputs. At block 1254, the method synchronizes the output for generating the orientation data with the common sensor input, wherein the orientation data is generated using the plurality of sensor inputs.

It should be appreciated that the specific sequence steps illustrated in FIG. 12B provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 12B may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Deriving the Fourth Component of a Quaternion System:

In some OS frameworks (such as Google Android), applications may have access to only three rotational vector (Quaternion) XYZ components, while not having access to the fourth component and in some instances the applications may need to derive the fourth component. The fourth component in the Quaternion rotational system is the angle size (W). Quaternion system contains four elements and one is responsible for the angle size and three for angle direction of components and projection of XYZ. In a quaternion system, the sum of squares of four elements equals one. Therefore, the application can recreate the magnitude of the fourth element with three elements present. However, since the square of the fourth component is equal to one minus the sum of squares of the remaining three components, the sign or orientation of the fourth angle cannot be recreated by the application layer, leaving an element of ambiguity in the fourth component.

If all the four components of the Quaternion system were available to the application layer from the OS frameworks layer then it would not have mattered if the angle size was positive or negative because the sign would be communicated to the application layer. However, some OS frameworks (such as Google Android) strip the quaternion angle away and only convey the three remaining XYZ components. When the consumer of the orientation data at the application layer regenerates the angle sign, the resulting sign is ambiguous to the application.

Embodiments may avoid confusion and ambiguity by generating a regional rotation vector so that its fourth element is always positive. A regional rotation vector can be generated by adjusting the XYZ components of the rotational vector. So when the Quaternion is stripped of the fourth element, and then client application recreates it, assuming that the size angle is positive, there is no ambiguity and no mistake.

Figure 13:
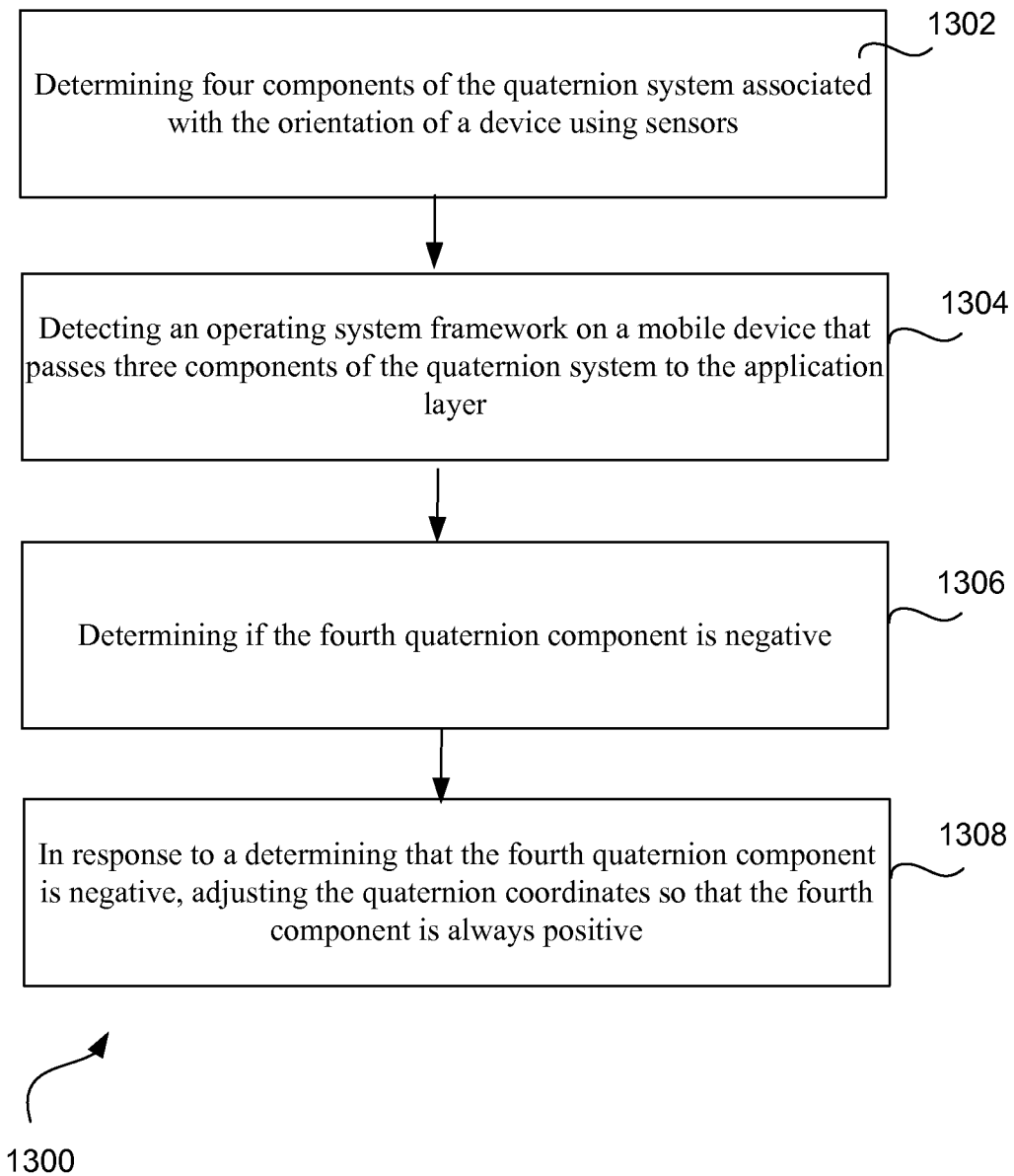
FIG. 13 is a simplified flow diagram illustrating a non-limiting embodiment of the invention for providing orientation data.

FIG. 13 is a simplified flow diagram illustrating a non-limiting embodiment of the invention for providing a mechanism for the application layer to derive the fourth component of a quaternion system where the fourth component is stripped out or not allowed by the operating system. The process 1300 may be performed by processing logic that comprises hardware (circuitry, dedicated logic, etc.), software (such as is run on a general purpose computing system or a dedicated machine), firmware (embedded software), or any combination thereof. In one embodiment, the process 1300 is performed by one or more computer devices 1600 as described in FIG. 16. In one embodiment, the sensors 1650 acquire the sensor input for further processing by filtering and processing components of the device described in FIG. 16.

At block 1302, the device 1600 determines the orientation data and the four components of the quaternion system associated with the orientation of the device 1600 using sensors. The orientation data may be determined using aspects discussed with reference to FIGS. 2-12. At block 1304, the device 1600 detects the operating system framework used on the device 1600 that may pass only three components of the quaternion system to the application layer. At block 1306, components of the device 1600 determine if the fourth quaternion component is negative. If the fourth quaternion component is negative, the method adjusts the quaternion coordinates so that the fourth component is always positive. In one implementation, the adjustment may be performed by reversing the signs for all four components of the quaternion (WXYZ) system. Such reversal may yield equivalent quaternion in terms of orientation, but with non-negative angle component.

It should be appreciated that the specific sequence steps illustrated in FIG. 13 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Increase Accuracy of Linear Acceleration by Using a Non-Normalized Gravity Vector:

Operating system (OS) frameworks (such as Google Android API) may need linear acceleration besides the gravity vector as an orientation data input. When the device 1600 is non-stationary, the measured acceleration has linear acceleration and gravity as components and error associated with the total measured acceleration. The error associated with the measured acceleration has an acceleration offset bias that is not removed using the filter. Since, gravity vector filter 202 is similar to a low pass filter in some respects, it eliminates noise, but it keeps all biases.

For simplicity, consider a system that is always stationary (and never rotating). Then the gyroscope 1660 may not be necessary and the gravity estimate can be obtained by averaging (filtering) of the XYZ components from the accelerometer 1655. However, the averaging may not eliminate the measurement bias. Now, in a rotating system, the gyroscope 1660 may enable the system to un-rotate the accelerometer measurements to a common reference frame by reducing the measurements to a pseudo-stationary system where biases are not removable. The reduced measurements are simply presented to the gyroscope-aided low pass filter with non-observable (hence non-removable) accelerometer 1655 biases. Hence, both, the measurement of linear acceleration and the measurement of gravity have an associated error component partly due to this unremovable bias for the acceleration offset that accounts for the total error in the measured acceleration.

Figure 14A:
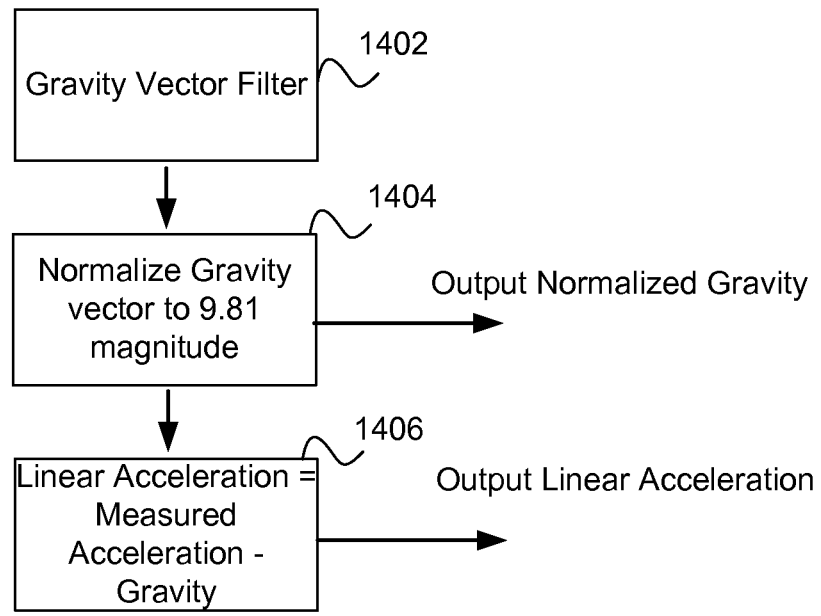
FIG. 14A is a simplified block diagram, illustrating a prior art system for generating linear acceleration.

FIG. 14A is a simplified block diagram, illustrating a prior art system for generating linear acceleration. As seen in FIG. 14A, in prior art systems, the linear acceleration is calculated by removing the normalized gravity from the measured acceleration from the gravity vector filter 1402, since most OS frameworks' require a normalized gravity vector as well. As shown at block 1404 of FIG. 14A, gravity is normalized by normalizing the output of the gravity vector filter using the fact that the magnitude of the true gravity vector is approximately 9.81 m/s$^2$ on earth. In measured acceleration, both linear acceleration and gravity have an associated error component. When normalized gravity is removed from the measured acceleration instead of measured gravity, the error associated with the measured gravity is not removed from the calculations and the linear acceleration has a larger error than just the error associated with the measured linear acceleration. For example, it is known that linear acceleration is zero when the device 1600 is stationary. Therefore, when gravity is removed from the measured acceleration the result should be zero. However, as shown at block 1406 of FIG. 14A, when normalized gravity is removed instead of measured linear gravity from the measured acceleration, the result in many cases is a non-zero number illustrating the difference between the normalized and non-normalized gravity and its associated effect on the accuracy of the calculated linear acceleration. Following equations represent the output as shown in FIG. 14A.

1. Filtered Gravity=low-pass (measured acceleration) (aided by gyroscope)
2. Output Gravity=Filtered Gravity*9.8086/normalized (Gravity)
3. Linear acceleration=Measured Acceleration−output Gravity (which is NOT high-pass (measured acceleration) thus NOT free of the accelerometer offset).

Figure 14B:
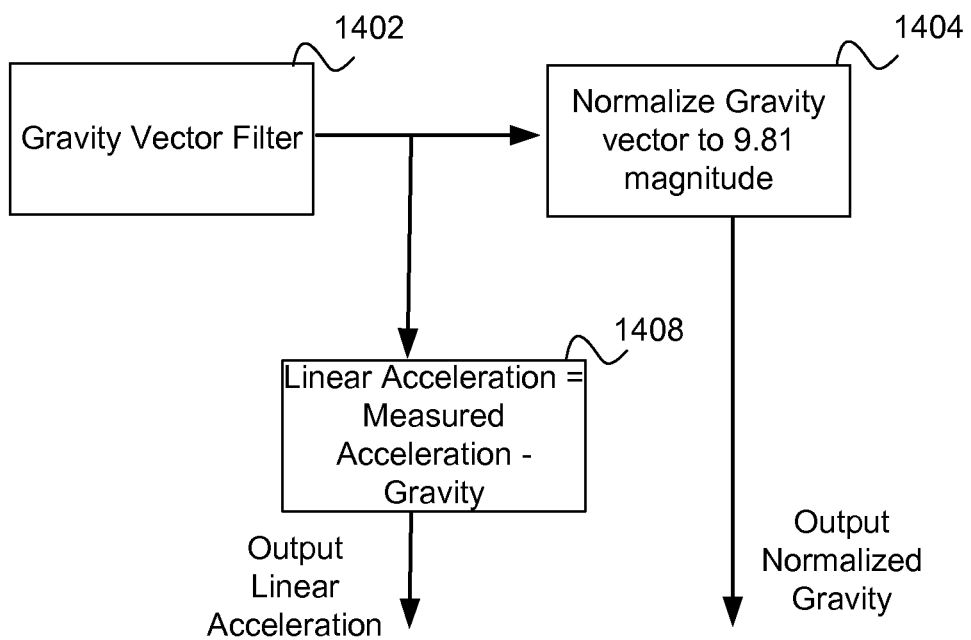
FIG. 14B is another simplified block diagram, illustrating a non-limiting system for generating linear acceleration according to embodiments of the invention.

FIG. 14B is a simplified block diagram, illustrating a non-limiting system for generating linear acceleration according to embodiments of the invention. As shown at 1408 in FIG. 14B, embodiments of the invention may be performed by the device 1600, by components such as the processor 1610 or a controller, and the non-normalized gravity may be used instead of normalized gravity (as shown in FIG. 14A) in deriving linear acceleration from measured acceleration (equation 2 below), even though the gravity vector is normalized for the OS framework. In some embodiments, so that the linear acceleration algorithm acts similar to a high pass filter and removes both gravity and accelerometer offset, the output gravity vector may be normalized AFTER the linear acceleration has been derived, as shown at 1404 in FIG. 14B. By using non-normalized gravity, linear acceleration may be immune to the accelerometer offset (at least in the stationary position), close to zero, within the accelerometer noise range. The non-normalized gravity is the filtered gravity. Thus, when the device 1600 is in a stationary position the linear acceleration is free of the accelerometer offset and output value for linear acceleration will be zero or closer to zero. Following equations represent the output according to the embodiments of the invention, as shown in FIG. 14B.

1. Filtered Gravity=low-pass (measured acceleration) (aided by gyroscope in some embodiments)
2. Linear acceleration=Measured Acceleration—Filtered Gravity (which is equivalent to high-pass (measured acceleration), therefore linear acceleration is free of the accelerometer offset, hence close to zero in the stationary position)

3. Output Gravity=Filtered Gravity*9.8086/normalized (Gravity)

Figure 15:
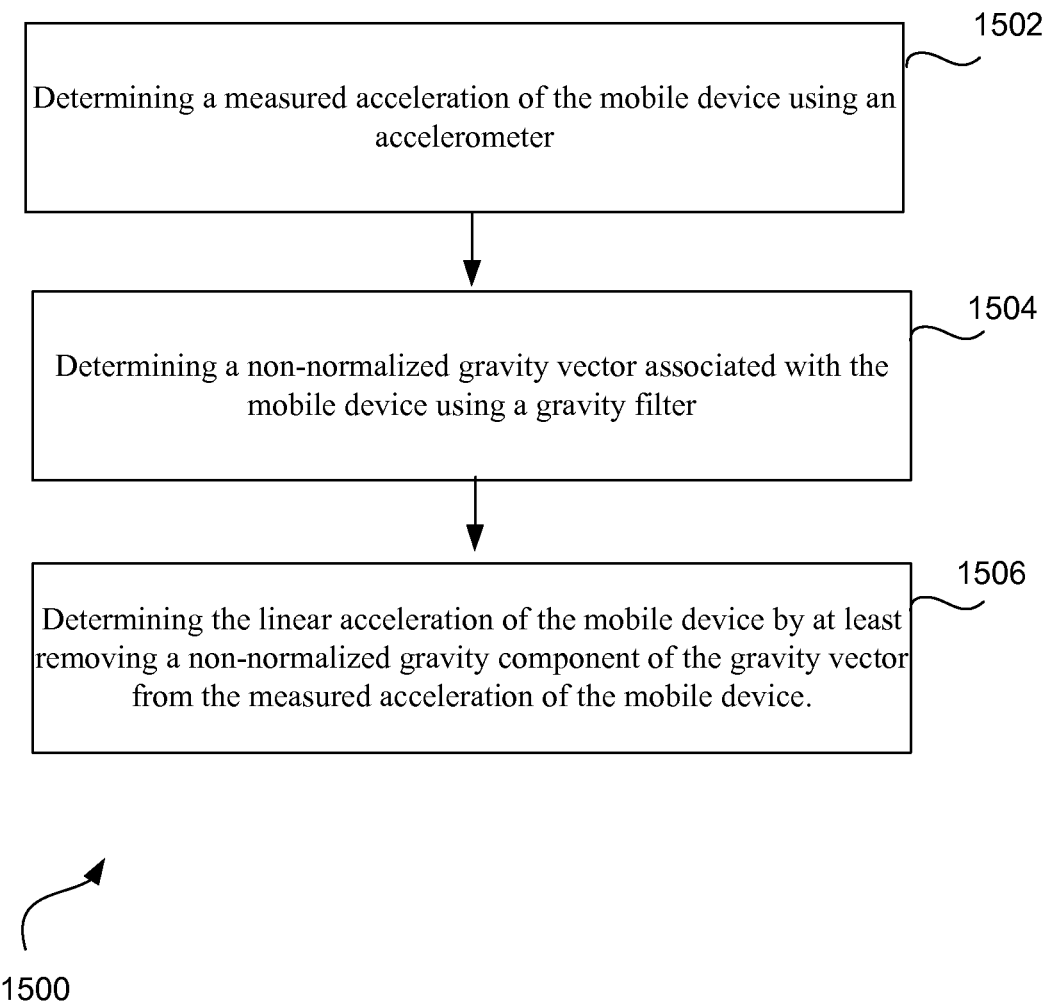
FIG. 15 is a simplified flow diagram illustrating a non-limiting example of a method for determining linear acceleration of a device according to embodiments of the invention.

FIG. 15 is a simplified flow diagram illustrating a non-limiting example of a method for determining linear acceleration of a device 1600 according to the embodiments of the invention. The process 1500 may be performed by processing logic that comprises hardware (circuitry, dedicated logic, etc.), software (such as is run on a general purpose computing system or a dedicated machine), firmware (embedded software), or any combination thereof. In one embodiment, the process 1500 is performed by one or more computer devices 1600 as described in FIG. 16. In one embodiment, the sensors 1650 acquire the sensor input for further processing by filtering and processing components of the device described in FIG. 16.

Referring to FIG. 15, at block 502, the device 1600 measures the acceleration using an accelerometer 1655. In measured acceleration includes both linear acceleration component and the gravity component and also has an associated error component for the linear acceleration component and the gravity component.

At block 1504, the device 1600 determines a non-normalized gravity vector associated with the device 1600 using a gravity vector filter 202. The gravity vector filter 202 may include inputs from an accelerometer 1655 and a gyroscope 1660.

Figure 16:
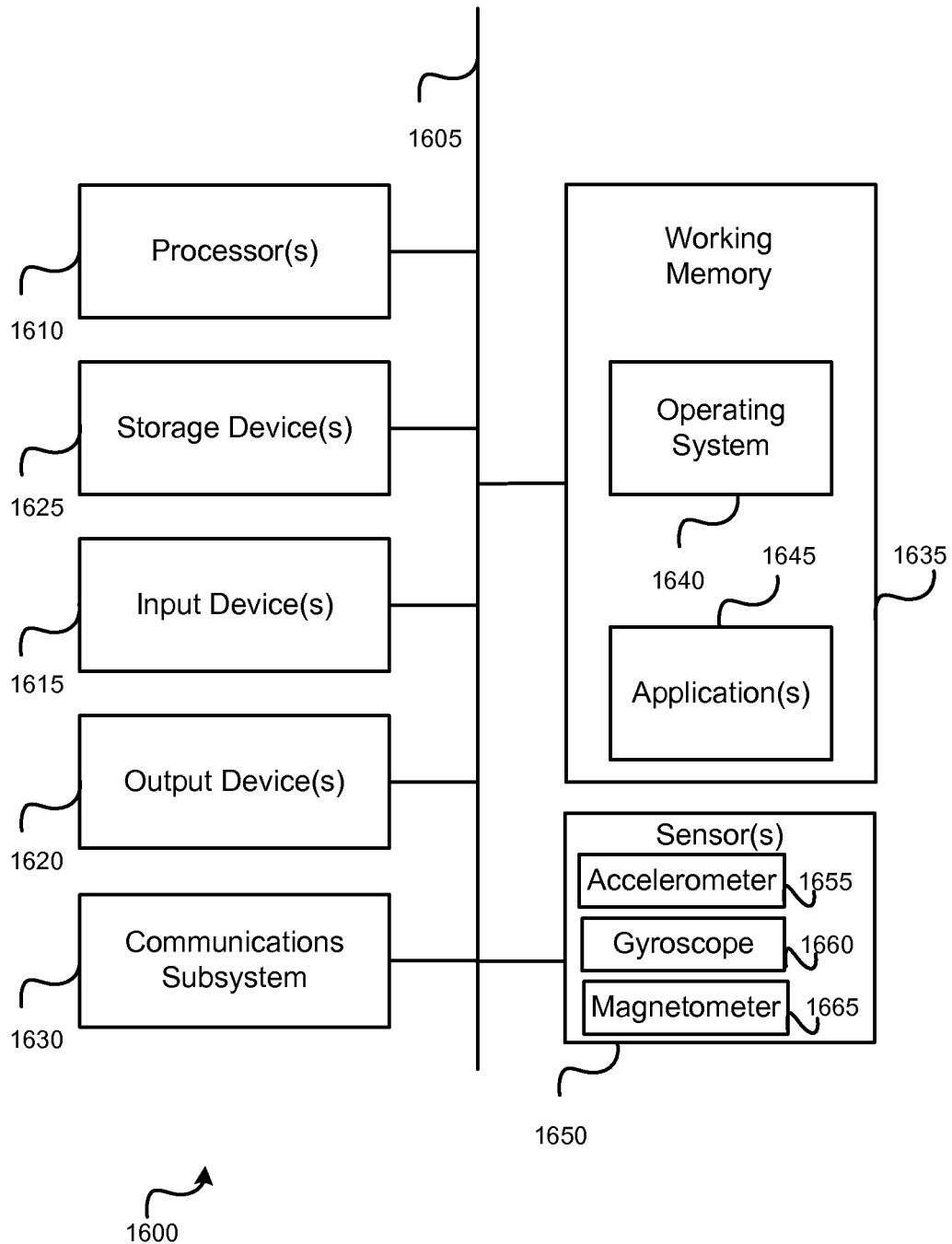
FIG. 16 illustrates an exemplary computing device incorporating parts of the device employed in practicing embodiments of the invention.

At block 506, the method performed by the device 1600, described in reference to FIG. 16, determines the linear acceleration of the device 1600 by at least removing a non-normalized gravity component (determined at step 1502) of the gravity vector from the measured acceleration of the device 1600. When non-normalized gravity component is removed from the measured acceleration instead of normalized gravity, the error associated with the gravity component is also removed. This results in a more accurate linear acceleration value.

It should be appreciated that the specific sequence of steps illustrated in FIG. 15 provides a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

A device as illustrated in FIG. 16 may be incorporated as part of the previously described computerized device. For example, device 1600 can represent some of the components of a hand-held or mobile device. A hand-held or mobile device may be any computing device with an input sensory unit like a camera and a display unit. Examples of a hand-held device include but are not limited to video game consoles, tablets, smart phones and devices. FIG. 16 provides a schematic illustration of one embodiment of a device 1600 that can perform the methods provided by various other embodiments, as described herein, and/or can function as the host device, a remote kiosk/terminal, a point-of-sale device, a device, a set-top box and/or a device. FIG. 16 is meant only to provide a generalized illustration of various components, any or all of which may be utilized as appropriate. FIG. 16, therefore, broadly illustrates how individual system elements may be implemented in a relatively separated or relatively more integrated manner.

The device 1600 is shown comprising hardware elements that can be electrically coupled via a bus 1605 (or may otherwise be in communication, as appropriate). The hardware elements may include one or more processors 1610, including without limitation one or more general-purpose processors and/or one or more special-purpose processors (such as digital signal processing chips, graphics acceleration processors, and/or the like); one or more input devices 1615, which can include without limitation a camera, a mouse, a keyboard and/or the like; and one or more output devices 1620, which can include without limitation a display unit, a printer and/or the like.

In addition, computing device 1600 may further include a plurality of sensors 1650, that may include but are not limited by, one or more accelerometers 1655 (e.g., accelerometer 1655), one or more gyroscopes 1660 (e.g., gyroscope 1660), and/or one or more magnetometers (e.g., magnetometer 1665), as illustrated in FIGS. 2, 7A, 7B, 10, and 11. Accelerometer 1655 may measure and/or provide (e.g., to processor 1610) information about acceleration experienced by computing device 1600 and/or otherwise sensed by accelerometer 1655. Gyroscope 1660 150 may similarly measure and/or provide (e.g., to processor 1610) information about gyroscopic motion (e.g., changes in orientation) experienced by computing device 1600 and/or otherwise sensed by gyroscope 1660 1655. In addition, magnetometer 1665 may measure and provide (e.g., to processor 1610) information regarding measurements of and/or changes in magnetic field (e.g., changes in bearing) experienced by computing device 1600 and/or otherwise sensed by magnetometer 1665. The processor 1610 may implement one or more of the gravity vector filter 202 and the magnetic vector filter 204 discussed above, for example as illustrated in FIGS. 2, 7A, 7B, 10, and 11. In other embodiments, these filters may be implemented in one or more of the sensors discussed above, or implemented as separate hardware or software components, for example as stored in the operating system 1640, application 1645, or other portion of the working memory 1635 or the storage device 1625.

The device 1600 may further include (and/or be in communication with) one or more non-transitory storage devices 1625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The device 1600 might also include a communications subsystem 1630, which can include without limitation a modem, a network card (wireless or wired), an infrared communication device, a wireless communication device and/or chipset (such as a Bluetooth™ device, an 1602.11 device, a WiFi device, a WiMax device, cellular communication facilities, etc.), and/or the like. The communications subsystem 1630 may permit data to be exchanged with a network (such as the network described below, to name one example), other devices, and/or any other devices described herein. In many embodiments, the device 1600 will further comprise a non-transitory working memory 1635, which can include a RAM or ROM device, as described above.

The device 1600 also can comprise software elements, shown as being currently located within the working memory 1635, including an operating system 1640, device drivers, executable libraries, and/or other code, such as one or more application programs 1645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods, for example any of the methods illustrated in FIGS. 2B, 2C, 3, 6, 8A, 8B, 9, 13, and 15.

A set of these instructions and/or code might be stored on a computer-readable storage medium, such as the storage device(s) 1625 described above. In some cases, the storage medium might be incorporated within a device, such as device 1600. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the device 1600 and/or might take the form of source and/or installable code, which, upon compilation and/or installation on the device 1600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a device (such as the device 1600) to perform methods in accordance with the disclosure. For example, some or all of the procedures of the described methods may be performed by the device 1600 in response to processor 1610 executing one or more sequences of one or more instructions (which might be incorporated into the operating system 1640 and/or other code, such as an application program 1645) contained in the working memory 1635. Such instructions may be read into the working memory 1635 from another computer-readable medium, such as one or more of the storage device(s) 1625. Merely by way of example, execution of the sequences of instructions contained in the working memory 1635 might cause the processor(s) 1610 to perform one or more procedures of the methods described herein.

The terms "machine-readable medium" and "computer-readable medium," as used herein, refer to any medium that participates in providing data that causes a machine to operate in a specific fashion. In an embodiment implemented using the device 1600, various computer-readable media might be involved in providing instructions/code to processor(s) 1610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1625. Volatile media include, without limitation, dynamic memory, such as the working memory 1635. Transmission media include, without limitation, coaxial cables, copper wire and fiber optics, including the wires that comprise the bus 1605, as well as the various components of the communications subsystem 1630 (and/or the media by which the communications subsystem 1630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the device 1600. These signals, which might be in the form of electromagnetic signals, acoustic signals, optical signals and/or the like, are all examples of carrier waves on which instructions can be encoded, in accordance with various embodiments of the invention.

The communications subsystem 1630 (and/or components thereof) generally will receive the signals, and the bus 1605 then might carry the signals (and/or the data, instructions, etc. carried by the signals) to the working memory 1635, from which the processor(s) 1610 retrieves and executes the instructions. The instructions received by the working memory 1635 may optionally be stored on a non-transitory storage device 1625 either before or after execution by the processor(s) 1610.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for obtaining orientation information for a computing device, the method comprising:
    receiving magnetometer data at a first Kalman filter, wherein the magnetometer data comprises sensor output from a magnetometer;
    receiving accelerometer data at a second Kalman filter, wherein the accelerometer data comprises sensor output from an accelerometer;
    receiving gyroscope data at the first Kalman filter and the second Kalman filter, wherein the gyroscope data comprises sensor output from a gyroscope;
    determining a magnetic vector by using the magnetometer data and the gyroscope data in the first Kalman filter;
    determining a gravity vector by using the accelerometer data and the gyroscope data in the second Kalman filter;
    changing a window size for the first Kalman filter based on a first type of environmental noise and changing a window size for the second Kalman filter based on a second type of environmental noise; and
    transitioning the gyroscope to a low power state in response to determining that the computing device has transitioned to a stationary state using one or more of the gravity vector or the magnetic vector.

2. The method of claim 1, further comprising at least one filter parameter for each of the first Kalman filter and the second Kalman filter that is dynamically adjustable.

3. The method of claim 2, wherein the at least one filter parameter associated with the second Kalman filter comprises one or more of a signal noise, a measurement error, a sensor calibration error or a linear acceleration.

4. The method of claim 2, wherein the at least one filter parameter associated with the first Kalman filter comprises one or more of sensor calibration error or a magnetic transient field.

5. The method of claim 1, further comprising an expanded adaptive filter, wherein the expanded adaptive filter receives as inputs computed coordinates of the gravity vector for the computing device along with the gyroscope data and the accelerometer data.

6. The method of claim 1, further comprising determining based on the magnetometer data and the gyroscope data, whether a detected change in a magnetic field in the magnetic vector filter is a magnetic anomaly.

7. The method of claim 6, further comprising:
    in response to determining that the detected change in the magnetic field is the magnetic anomaly, increasing the window size associated with the first Kalman filter.

8. The method of claim 6, further comprising:
    in response to determining that the gyroscope did not measure a change during a period of time in which a change in a magnetic field was detected, determining that the detected change in the magnetic field is the magnetic anomaly.

9. The method of 6,
    wherein the detected change in the magnetic field is determined not to be the magnetic anomaly when the received sensor output from the gyroscope correlates to a detected change in the magnetic field; and
    wherein the detected change in the magnetic field is determined to be the magnetic anomaly when the received sensor output from the gyroscope does not correlate to the detected change in the magnetic field.

10. The method of claim 6, further comprising:
    in response to determining that the detected change in the magnetic field is the magnetic anomaly, disregarding filter input received from the magnetometer corresponding to the detected change in the magnetic field.

11. The method of claim 6, wherein determining the detected change is the magnetic anomaly comprises comparing the magnetometer data to a threshold.

12. The method of claim 11, further comprising calculating the threshold based at least in part on the gyroscope data.

13. A computing device for determining orientation, comprising:
    a receiver coupled to a first Kalman filter and configured to:
        receive magnetometer data at the first Kalman filter, wherein the magnetometer data comprises sensor output from a magnetometer;
        receive gyroscope data at the first Kalman filter, wherein the gyroscope data comprises sensor output from a gyroscope; and
    the first Kalman filter configured to:
        determine a magnetic vector by using the magnetometer data and the gyroscope data in the first Kalman filter;
    a receiver coupled to a second Kalman filter and configured to:
        receive accelerometer data at the second Kalman filter, wherein the accelerometer data comprises sensor output from an accelerometer;
        receive the gyroscope data at the second Kalman filter; and
    the second Kalman filter configured to:
        determine a gravity vector by using the accelerometer data and the gyroscope data in the second Kalman filter, wherein the gravity vector is used for determining the orientation of the computing device; and
one or more processors configured to:
change a window size for the first Kalman filter based on a first type of environmental noise;
change a window size for the second Kalman filter based on a second type of environmental noise; and
transition the gyroscope to a low power state in response to determining that the computing device has transitioned to a stationary state using one or more of the gravity vector or the magnetic vector.

14. The computing device of claim 13, further comprising at least one filter parameter for each of the first Kalman filter and the second Kalman filter that is dynamically adjustable.

15. The computing device of claim 14, wherein the at least one filter parameter associated with the second Kalman filter comprises one or more of a signal noise, a measurement error, a sensor calibration error or a linear acceleration.

16. The computing device of claim 14, wherein the at least one filter parameter associated with the first Kalman filter comprises one or more of sensor calibration error or a magnetic transient field.

17. The computing device of claim 13, further comprising an expanded adaptive filter, wherein the expanded adaptive filter receives as inputs computed coordinates of the gravity vector for the computing device along with the gyroscope data and the accelerometer data.

18. The computing device of claim 13, the first Kalman filter further configured to determine based on the magnetometer data and the gyroscope data, whether a detected change in a magnetic field in the first Kalman filter is a magnetic anomaly.

19. The computing device of claim 18, wherein the first Kalman filter is configured to determine the detected change is the magnetic anomaly by comparing the magnetometer data to a threshold.

20. The computing device of claim 19, wherein the first Kalman filter is configured to calculate the threshold based at least in part on the gyroscope data.

21. The computing device of claim 18, wherein the first Kalman filter is further configured to determine that the detected change in the magnetic field is the magnetic anomaly, in response to determining that the gyroscope did not measure a change during a period of time in which the change in the magnetic field was detected.

22. The computing device of claim 18,
wherein the detected change in the magnetic field is determined by the first Kalman vector filter not to be the magnetic anomaly when the received sensor output from the gyroscope correlates to a detected change in the magnetic field; and
wherein the detected change in the magnetic field is determined by the first Kalman filter to be the magnetic anomaly when the received sensor output from the gyroscope does not correlate to the detected change in the magnetic field.

23. The computing device of claim 18, the first Kalman filter further configured to disregard filter input received from the magnetometer corresponding to the detected change in the magnetic field, in response to determining that the detected change in the magnetic field is the magnetic anomaly.

24. The computing device of claim 18, the one or more processors are further configured to increase the window size associated with the first Kalman filter in response to determining the detected change in the magnetic field is the magnetic anomaly.

25. A non-transitory computer readable storage medium, wherein the non-transitory computer readable storage medium comprises instructions executable by a processor, the instructions comprising instructions to:
receive magnetometer data at a first Kalman filter, wherein the magnetometer data comprises sensor output from a magnetometer;
receive accelerometer data at a second Kalman filter, wherein the accelerometer data comprises sensor output from an accelerometer;
receive gyroscope data at the first Kalman filter and the second Kalman filter, wherein the gyroscope data comprises sensor output from a gyroscope;
determine a magnetic vector by using the magnetometer data and the gyroscope data in the first Kalman;
determine a gravity vector by using the accelerometer data and the gyroscope data in the second Kalman filter;
change a window size for the first Kalman filter based on a first type of environmental noise and change a window size for the second Kalman filter based on a second type of environmental noise; and
transition the gyroscope to a low power state in response to determining that a computing device comprising the processor has transitioned to a stationary state using one or more of the gravity vector or the magnetic vector.

26. An apparatus, comprising:
means for receiving magnetometer data at a first Kalman filter, wherein the magnetometer data comprises sensor output from a magnetometer;
means for receiving accelerometer data at a second Kalman filter, wherein the accelerometer data comprises sensor output from an accelerometer;
means for receiving gyroscope data at the first Kalman filter and the second Kalman filter, wherein the gyroscope data comprises sensor output from a gyroscope;
means for determining a magnetic vector by using the magnetometer data and the gyroscope data in the first Kalman filter;
means for determining a gravity vector by using the accelerometer data and the gyroscope data in the second Kalman filter;
means for changing a window size for the first Kalman filter based on a first type of environmental noise and changing a window size for the second Kalman filter based on a second type of environmental noise; and
means for transitioning the gyroscope to a low power state in response to determining that the apparatus has transitioned to a stationary state using one or more of the gravity vector or the magnetic vector.

27. The apparatus of claim 26, further comprising at least one filter parameter for each of the first Kalman filter and the second Kalman filter that is dynamically adjustable.

28. The apparatus of claim 26, further comprising a means for determining based on the magnetometer data and the gyroscope data, whether a detected change in a magnetic field in the magnetic vector filter is a magnetic anomaly;
wherein the detected change in the magnetic field is determined not to be the magnetic anomaly when the received sensor output from the gyroscope correlates to a detected change in the magnetic field; and
wherein the detected change in the magnetic field is determined to be the magnetic anomaly when the received sensor output from the gyroscope does not correlate to the detected change in the magnetic field.

29. The apparatus of claim 26, further comprising:
means for disregarding filter input received from the magnetometer corresponding to the detected change in the magnetic field or means for increasing the window size associated with the first Kalman filter, in response to determining that the detected change in the magnetic field is a magnetic anomaly.

* * * * *